United States Patent
Busa

(10) Patent No.: US 9,940,593 B2
(45) Date of Patent: *Apr. 10, 2018

(54) MANAGEMENT AND ALLOCATION OF SERVICES USING REMOTE COMPUTER CONNECTIONS

(71) Applicant: BUSA Strategic Partners, LLC, Las Vegas, NV (US)

(72) Inventor: Anthony Busa, Casselberry, FL (US)

(73) Assignee: Busa Strategic Partners LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,152

(22) Filed: May 8, 2017

(65) Prior Publication Data
US 2017/0249579 A1    Aug. 31, 2017

Related U.S. Application Data

(63) Continuation of application No. 14/960,864, filed on Dec. 7, 2015, now Pat. No. 9,646,331, which is a (Continued)

(51) Int. Cl.
*G06F 15/173* (2006.01)
*G06F 15/16* (2006.01)
(Continued)

(52) U.S. Cl.
CPC ... *G06Q 10/063112* (2013.01); *G06Q 20/145* (2013.01); *G06Q 30/04* (2013.01);
(Continued)

(58) Field of Classification Search
CPC ...... G06Q 20/00–20/425; G06Q 30/04; H04L 41/5061–41/5074; H04L 63/02–63/029; H04L 63/20–63/205; H04L 65/1066–65/1096; H04L 74/14–74/148; H04L 74/28–74/2895
See application file for complete search history.

(56) References Cited

U.S. PATENT DOCUMENTS

| | | | | |
|---|---|---|---|---|
| 5,790,635 | A | * | 8/1998 | Dezonno ............. H04M 3/2272 379/265.03 |
| 6,035,332 | A | * | 3/2000 | Ingrassia, Jr. ....... G06F 11/3495 707/E17.111 |

(Continued)

*Primary Examiner* — David Lazaro
*Assistant Examiner* — Julian Chang
(74) *Attorney, Agent, or Firm* — Allen, Dyer, Doppelt & Gilchrist, P.A.

(57) ABSTRACT

A computer-implemented method for allocating services among a plurality of service operators where each capable of providing at least one service and each service operator operating a respective computer to receiving at a support server a request for service from at least one computer being operated by a user, generating a questionnaire to be answered by the user operating the at least one computer, selecting at least one service operator based upon the answered questionnaire, and establishing a service session between the at least one computer being operated by the user and the computer being operated by the at least one selected service operator for providing the requested service.

20 Claims, 34 Drawing Sheets

Related U.S. Application Data continuation of application No. 14/255,105, filed on Apr. 17, 2014, now Pat. No. 9,208,461, which is a continuation of application No. 11/732,793, filed on Apr. 4, 2007, now Pat. No. 8,738,777.

(60) Provisional application No. 60/788,981, filed on Apr. 4, 2006.

(51) Int. Cl.
   *G06Q 10/06* (2012.01)
   *H04L 29/08* (2006.01)
   *G06Q 20/14* (2012.01)
   *G06Q 30/04* (2012.01)
   *H04L 29/06* (2006.01)

(52) U.S. Cl.
   CPC .......... *H04L 67/025* (2013.01); *H04L 67/141* (2013.01); *H04L 63/02* (2013.01)

(56) References Cited

U.S. PATENT DOCUMENTS

| | | | | |
|---|---|---|---|---|
| 6,260,048 B1* | 7/2001 | Carpenter | ........... | G06F 11/0769 |
| 6,832,176 B2* | 12/2004 | Hartigan | ................ | G07C 1/00 |
| | | | | 702/178 |
| 6,928,464 B2* | 8/2005 | Appiah | ............... | H04L 63/0869 |
| | | | | 709/204 |
| 7,787,609 B1* | 8/2010 | Flockhart | ............ | H04M 3/5233 |
| | | | | 379/265.01 |
| 8,041,365 B1* | 10/2011 | Gentle | ................... | G06Q 30/02 |
| | | | | 379/265.01 |
| 8,126,133 B1* | 2/2012 | Everingham | .. | G06Q 10/063112 |
| | | | | 379/265.01 |
| 8,238,541 B1* | 8/2012 | Kalavar | ............. | H04M 3/5233 |
| | | | | 379/265.06 |
| 8,738,777 B2* | 5/2014 | Busa | ...................... | G06Q 10/06 |
| | | | | 705/304 |
| 9,646,331 B2* | 5/2017 | Busa | ................... | G06Q 20/145 |
| 2001/0014143 A1* | 8/2001 | Kuhn | ...................... | H04M 3/51 |
| | | | | 379/67.1 |
| 2001/0034711 A1* | 10/2001 | Tashenberg | ........... | G06F 9/4843 |
| | | | | 705/52 |
| 2002/0010705 A1* | 1/2002 | Park | ........................ | G06Q 10/10 |
| 2002/0062347 A1* | 5/2002 | Low | ........................ | G06Q 30/06 |
| | | | | 709/204 |
| 2002/0071529 A1* | 6/2002 | Nelkenbaum | ....... | H04L 12/1831 |
| | | | | 379/88.13 |
| 2002/0072808 A1* | 6/2002 | Li | ..................... | G06Q 10/06398 |
| | | | | 700/5 |
| 2002/0073210 A1* | 6/2002 | Low | ........................ | G06Q 20/40 |
| | | | | 709/228 |
| 2002/0091850 A1* | 7/2002 | Perholtz | ............... | H04M 11/045 |
| | | | | 709/231 |
| 2003/0055728 A1* | 3/2003 | Lin | ........................ | G06Q 20/12 |
| | | | | 705/14.23 |
| 2003/0065731 A1* | 4/2003 | Mohammed | ............ | G06F 21/33 |
| | | | | 709/208 |
| 2003/0099343 A1* | 5/2003 | Dezonno | ............. | H04M 3/5191 |
| | | | | 379/265.11 |
| 2003/0110044 A1* | 6/2003 | Nix | ....................... | G06Q 20/102 |
| | | | | 705/34 |
| 2003/0195848 A1* | 10/2003 | Felger | ................... | H04M 15/68 |
| | | | | 705/40 |
| 2003/0225989 A1* | 12/2003 | Licalsi | .................. | G06Q 30/04 |
| | | | | 711/167 |
| 2004/0083195 A1* | 4/2004 | McCord | ............. | H04M 3/5233 |
| | | | | 706/47 |
| 2004/0103320 A1* | 5/2004 | Storer | ................. | H04L 63/0227 |
| | | | | 726/11 |
| 2004/0128585 A1* | 7/2004 | Hind | ..................... | G06F 11/366 |
| | | | | 714/38.14 |
| 2004/0168164 A1* | 8/2004 | Shevchenko | ....... | G06F 11/2257 |
| | | | | 717/168 |
| 2004/0210658 A1* | 10/2004 | Guillermo | ............ | G06F 3/0481 |
| | | | | 709/227 |
| 2005/0071178 A1* | 3/2005 | Beckstrom | ............... | H04M 3/51 |
| | | | | 379/88.08 |
| 2005/0080897 A1* | 4/2005 | Braun | ................... | H04L 41/0803 |
| | | | | 709/225 |
| 2005/0141678 A1* | 6/2005 | Anders | .................... | H04L 63/30 |
| | | | | 379/67.1 |
| 2005/0144099 A1* | 6/2005 | Deb | ....................... | G06Q 20/12 |
| | | | | 705/35 |
| 2005/0154693 A1* | 7/2005 | Ebert | ................. | G06F 17/30874 |
| 2005/0182743 A1* | 8/2005 | Koenig | ................... | G06F 19/327 |
| 2005/0190769 A1* | 9/2005 | Smith | ..................... | H04L 12/66 |
| | | | | 370/395.2 |
| 2005/0235267 A1* | 10/2005 | McClard | ............ | G06F 11/3419 |
| | | | | 717/127 |
| 2006/0031516 A1* | 2/2006 | Kumer | .................. | G06Q 10/00 |
| | | | | 709/227 |
| 2006/0075104 A1* | 4/2006 | Kumer | ................. | G06Q 20/102 |
| | | | | 709/227 |
| 2006/0126817 A1* | 6/2006 | Beckett, II | ......... | H04M 3/5175 |
| | | | | 379/265.06 |
| 2006/0233349 A1* | 10/2006 | Cooper | ............... | H04M 3/5175 |
| | | | | 379/265.06 |
| 2006/0277096 A1* | 12/2006 | Levitus | .................. | G06Q 10/06 |
| | | | | 705/301 |
| 2007/0007331 A1* | 1/2007 | Jasper | .................... | G06Q 20/20 |
| | | | | 235/379 |
| 2007/0019617 A1* | 1/2007 | Hancock | ............. | H04L 41/0681 |
| | | | | 370/352 |
| 2007/0106811 A1* | 5/2007 | Ryman | ................. | H04L 29/06027 |
| | | | | 709/230 |
| 2007/0174081 A1* | 7/2007 | Smith | .................. | G06Q 10/109 |
| | | | | 705/307 |
| 2007/0174710 A1* | 7/2007 | Duan | ................... | G06F 11/0727 |
| | | | | 714/38.14 |
| 2007/0185957 A1* | 8/2007 | Mandalia | ............ | H04L 65/4007 |
| | | | | 709/204 |
| 2007/0198432 A1* | 8/2007 | Pitroda | ................ | G06Q 20/02 |
| | | | | 705/64 |
| 2007/0208575 A1* | 9/2007 | Habichler | ........ | G06Q 10/06398 |
| | | | | 705/7.42 |
| 2009/0016522 A1* | 1/2009 | Torres | ................ | H04M 3/42221 |
| | | | | 379/265.06 |
| 2013/0024315 A1* | 1/2013 | Blau | ..................... | G06Q 20/10 |
| | | | | 705/26.3 |

* cited by examiner

MANAGEMENT AND ALLOCATION OF SERVICES USING REMOTE COMPUTER CONNECTIONS

RELATED APPLICATION

This application is a continuation of U.S. application Ser. No. 14/960,864 filed Dec. 7, 2015 which claims benefit of U.S. application Ser. No. 14/255,105 filed Apr. 17, 2015, now U.S. Pat. No. 9,208,461, which claims benefit of U.S. application Ser. No. 11/732,793 filed Apr. 4, 2007, now U.S. Pat. No. 8,738,777, which claims the benefit of U.S. Provisional Application Ser. No. 60/788,981 filed Apr. 4, 2006, the contents of which are hereby incorporated herein by reference in their entireties.

FIELD OF THE INVENTION

The present invention relates to the field of professional services, and more particularly, to a professional service operator remotely accessing a user's computer to provide service.

BACKGROUND OF THE INVENTION

The highly specialized work force in modern economies must be carefully allocated to service tasks so that workers may perform in areas in which they have the training or skills to perform effectively. Allocating workers to appropriate service tasks is a manual process, requiring substantial amounts of time from both the workers providing service and the supervisors who manage the workers.

The manual steps required to allocate workers to service tasks is illustrated in the following technical support example. A computer user experiencing technical problems with their computer calls a computer support company. The call is routed to a help desk where a help desk worker asks a series of questions to identify the computer user's specific problem. If the help desk worker is not able to identify the specific problem, the caller is transferred to a supervisor or other higher level worker who will attempt to identify the specific problem. Once the problem is identified, the supervisor or other higher level employee goes through a manual process to decide who will be dispatched to provide service to the computer user.

These manual steps to identify the service needed and to allocate a worker to the service task are costly for both the computer user and the computer support company. The computer support company devotes valuable time for lower level workers and supervisors to evaluate the service needed, and to assign a service operator to the problem. The process is also costly for the computer user who pays for the time spent identifying the service needed and assigning the appropriate service operator to the problem. The same or similar manual steps are likewise required when allocating service operators to service tasks in a wide range of fields other than computer technical support.

To overcome some of these limitations, remote access desktop technology allows computer users to access and control other computers at remote locations. GoToMyPC© is an example of software that allows a service operator to remotely access a computer over the Internet. This technology typically comprises two software components: a program running on the remote computer, and a program running on the local computer. Remote desktop access technology allows the service operator to control a remote computer as if sitting in front of the remote computer. The service operator can run applications, access files, change configurations, or debug problems, for example.

The GoToAssist© product provides another example of remote desktop access technology. GoToAssist© provides functionality similar to GoToMyPC© but adds additional features such as the ability for an administrator to review connections and manually select the computers to be connected. GoToAssist© also allows a supervisor to review information about remote computer connections while computers are connected.

Existing remote desktop technology increases service efficiency by eliminating the need for a service operator to physically travel to the computer user's location. However, all the manual steps described above still need to be performed to determine which service operator will provide the necessary support service over the remote desktop connection. The overall process is, therefore, still highly inefficient.

SUMMARY OF THE INVENTION

In view of the foregoing background, an object of the present invention is to reduce or eliminate the manual steps required to allocate one of a plurality of service operators, each with a different skill or skill level, to provide a particular service requested by a user.

This and other objects, advantages and features are provided by a computer-implemented method for allocating services among a plurality of service operators each capable of providing at least one service and each service operator operating a respective computer to receive at a support server a request for service from at least one computer being operated by a user, generating a questionnaire to be answered by the user operating the at least one computer, selecting at least one service operator based upon the answered questionnaire, and establishing a service session between the at least one computer being operated by the user and the computer being operated by the at least one selected service operator for providing the requested service.

In some embodiments, the requested service is performed on the at least one computer being operated by the user, but it may also be performed on the computer being operated by the at least one selected service operator. Alternatively, the requested service may be performed at a service workspace that is separate from the at least one computer being operated by the user and the computer being operated by the at least one selected service operator, with the service workspace being accessible by each. If such a service workspace is used, the at least one selected service operator may continue to provide service on the service workspace even after the user terminates his or her connection to the service workspace.

Additionally, an established service session may also include a computer being operated by a second service operator, where the second service operator also provides the requested service. A questionnaire may also be used to request information relating to a type of service to be performed, and may optionally be generated based upon information collected from the at least one computer being operated by the user. A questionnaire may also prompt the user to select a priority level of the requested service, including priority levels corresponding to a level of urgency of the requested service, the level of expertise provided by the plurality of service operators or other priority levels.

Yet another aspect is directed to providing billing information to the user during the service session, with the billing information being updated during the service session. Billing information may also be provided by billable minutes that may be charged when the at least one selected service operator is active, and if the at least one selected service operator is not active, then the user may not be billed until the at least one selected service operator is active again. The service session may also include a supervisor monitoring during the service session at least a portion of the service provided by the at least one selected service operator.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The invention addresses the use of remote desktop access to streamline providing of a wide range of services through automating processes that were previously provided manually.

Figure 1:
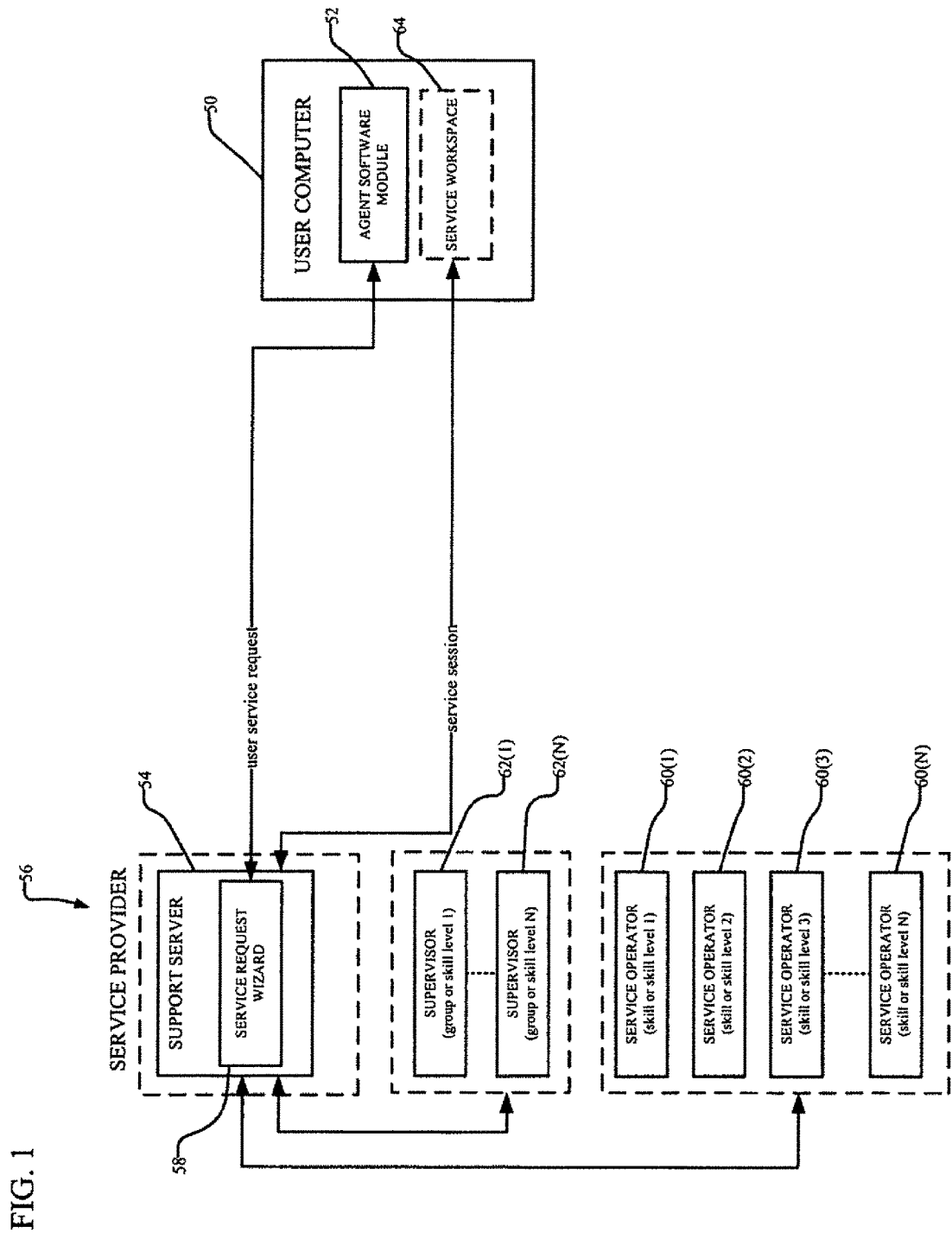
FIG. 1 is a block diagram showing a support server receiving and evaluating a user's service request, and assigning the appropriate service operator to handle the service request in accordance with the present invention.

With reference to FIG. 1, a user requests service via the user's computer 50 using an agent software module 52, and the request is electronically transmitted to a support server 54 at the service provider's location 56. A service request wizard 58 on the support server 54 requests information from the user regarding the type of service needed. In FIG. 1, the service request wizard 58 is shown at the support server 54 but may be located on a user computer 50, on a virtual desktop, on some other computer or service workspace or some combination of the above. Similarly, the agent software module 52 is illustratively shown on the user's computer but may be located on a virtual desktop, some other computer or workspace or some combination of the above. A combination of computers or service workspaces may be utilized by performing some of the processing for the agent software module 52 or the service request wizard 58 on more than one computer or service workspace. After the service request wizard 58 obtains sufficient information regarding the type of service needed, the service request wizard 58 evaluates the predetermined skill or skill level of the available service operators 60(1)-60(N) and selects the appropriate service operator to provide the service. Reference numeral 60 is used to generally reference a service operator or operators. Although the service operators 60 are shown next to the support server 54 in FIG. 1, the service operators are not required to be physically present at the same location as the support server. Similarly, the supervisor 62 may be present at the location of the support server 54 but is not required to be physically present at the support server's location. Reference numerals 62(1) through 62(N) are used to indicate that there may be one supervisor 62 or multiple supervisors 62(1) through 62(N). Reference numeral 62 is used to generally reference a supervisor or supervisors. The service operator 60 then contacts the user to begin providing services, and uses a remote desktop connection or some other service session connection to the user's computer 50 to provide services more efficiently.

Figure 2:
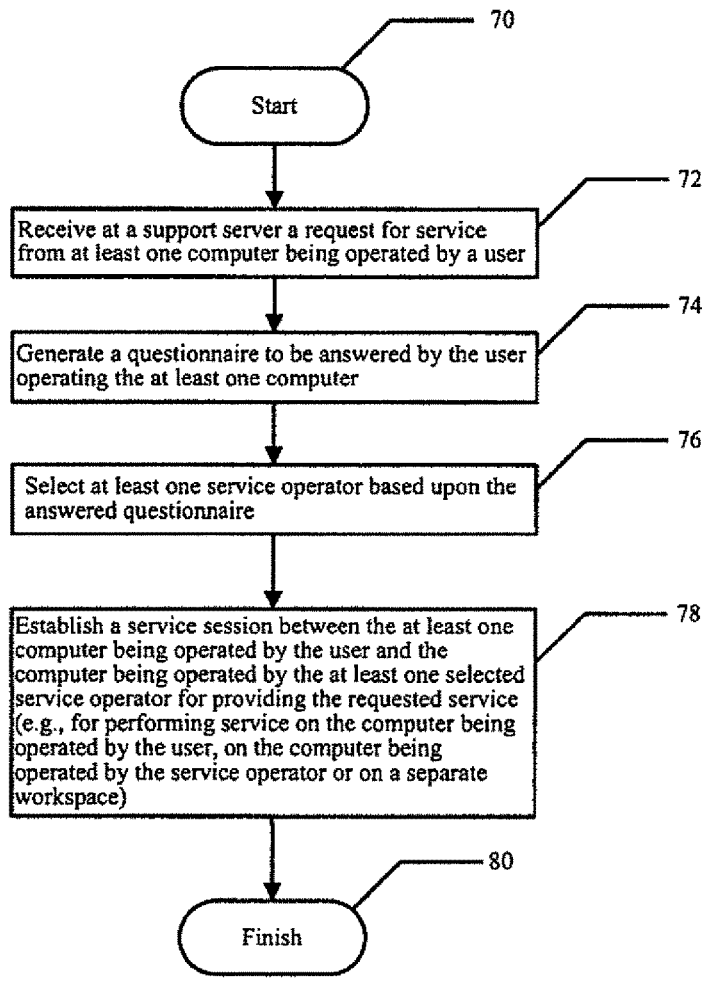
FIG. 2 is a flow diagram showing a method for allocating services among a plurality of service operators where each service operator is capable of providing at least one service in accordance with the present invention.

With reference now to FIG. 2, a computer-implemented method for allocating services among a plurality of service operators 60 is provided in which each service operator is capable of providing at least one service and each service operator is operating a computer. The method begins at start (Block 70) and proceeds to receiving at a support server a request for service from at least one computer being operated by a user (Block 72). After the request for service is received, a questionnaire to be answered by the user operating the at least one computer is generated (Block 74). As is described in more detail below, the questionnaire may be generated based on a variety of criteria and may request a variety of different information from the user to determine the area or areas of service needed. The questionnaire is then used to select at least one service operator 60 (Block 76). After at least one service operator 60 is selected, a service session between the at least one computer being operated by the user and the computer being operated by the at least one selected service operator is established for providing the requested service (Block 78). After services have been provided, the service session may continue but is preferably terminated at Block 80.

Figure 32:
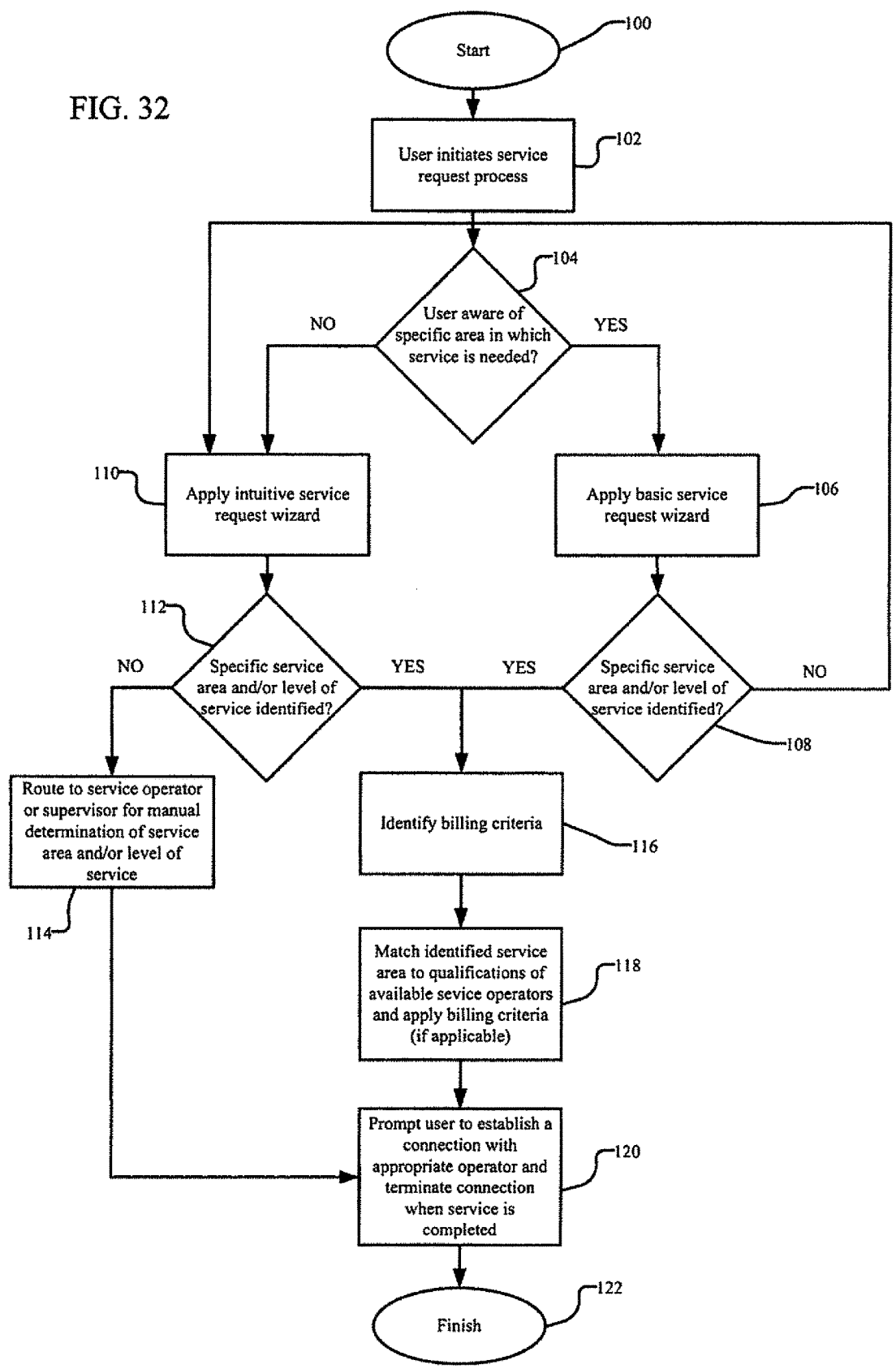
FIG. 32 is a flow diagram showing a method of categorizing operators in accordance with the present invention.

With reference now to FIG. 32, from the start (Block 100) a user initiates a service request (Block 102) using the agent software module 52. The support server 54 evaluates the incoming request in Block 104 to determine what type of service request wizard 58 should be used to identify the specific service needed. The service request wizard 58 preferably provides a questionnaire for the user to determine what type of service the user needs. For certain embodiments, all users will receive the same questionnaire. In other embodiments, the questionnaire can be targeted to specific groups, such as one questionnaire targeted to all users from a corporate client, while a different questionnaire or set of questionnaires may be used for individual, non-corporate clients. In still other embodiments, the questionnaire may be targeted to groups of users by known areas of service needed, such as a law-focused questionnaire where it is known that legal services will be requested, or a technical support questionnaire where it is known that technical support will be requested. Depending on the variety of different user service needs, any combination of the above types of questionnaires as well as the basic and intuitive wizard questionnaires below may be used to determine the correct service operator 60 to provide service.

The questionnaire may be presented to the user via a basic service request wizard 58, an intuitive service request wizard 110 or some combination of the two. If the user is aware of the specific area in which service is needed, the basic service request wizard 58 allows the user to make category to sub-category selections in Block 106 until the service request wizard 58 identifies the specific area in which service is needed. If the user has been incorrectly routed to the basic service request wizard 58, and does not actually know the area in which service is needed (Block 108), the user is routed to the intuitive service wizard in Block 110. Additionally, using either request wizard, problem definition progress may be terminated where additional details regarding the service needed by the user are not necessary to make best selection from available service operators 60.

The intuitive service request wizard 58 is used to help the user identify the specific area in which service is needed. If the intuitive service request wizard 58 in Block 110 is not successful in identifying the area in which service is needed, the request is routed to a "live" service operator 60 or supervisor in Block 114 to help the user identify the specific service area.

The service request wizard 58 or other questionnaire may also take into account user's preferences, online status, availability intervals, service operator 60 feedback ratings and seniority, language preferences and other information.

After the specific service area and/or level of service is identified in Block 108 or 112, the user is optionally asked to input billing information in Block 116, such as the level of priority and hence charges for service requested. If a service area or level of service is not determined, the method routes to a service operator 60 or supervisor 62 for manual determination (Block 114). Once the billing information is obtained in embodiments where billing information is requested, the service request wizard 58 compares the services requested to the qualifications of the available service operators 60, and selects the service operator 60 best suited to provide the service in Block 118. The support server 54 or the service operator 60 then prompts the user to establish some level of connection with the service operator 60 (e.g., chat, voice over IP, remote desktop connection) in Block 120. Once the user accepts the service operator's 60 request to provide service, the service operator 60 provides services to the user. Once service is complete, either the user, the service operator 60 or the support server 54 can terminate the session, and the process is stopped at Block 122.

A remote computer connection or other service session between a service operator 60 and the user will typically consume at least some resources from the user computer 50 and the computer used by the service operator 60. As will be appreciated by those skilled in the art, a greater portion of the service may be performed at one location, such as the user's computer 50 or the computer used by the service operator 60, while less or perhaps none of the service work is performed at other locations during the service session. The computer used to perform the service will typically have more of its resources consumed (e.g., processing capacity, memory consumption, etc.) than will computers at locations where less processing or no processing of service work occurs. A variety of different configurations may be used during the service session to determine which resources are used.

The service operator 60 may provide service directly on the user's computer 50 utilizing the resources of the user's computer, such as the user computer's hardware and software to provide service. The service operator 60 may also provide service to the user while utilizing the resources of the computer used by the service operator. In another embodiment, the service may be provided utilizing the resources of the support server 54 or some other computer.

The service workspace 64 is the place where the service is provided. The service workspace 64 may optionally be a virtual desktop or other similar workspaces that allow service work to proceed in a separate environment. The service workspace 64 for use in a service session may be provided on the user computer 50, the computer used by the service operator 60, the support server 54 or through some other computer. One significant advantage of the service workspace 64 when configured as a virtual desktop type workspace is that it allows service to be provided by a service operator 60 while still allowing the user computer 50 to be used for tasks other than the service provided by the service operator. In situations where the user computer 50, the computer used by the service operator 60 or other computers involved in the service session are not able to provide a virtual desktop type service workspace 64, the service workspace may be provided by the support server 54 or other computer.

The virtual desktop type service workspace 64 may be accessed at the same time by the service operator 60, supervisor 62, and the user during the service session. This allows the service operator 60 to provide service, the supervisor 62 to monitor as well as provide service as another service operator, and also allowing the user to view the service being provided and optionally obtain other information such as billing information. Where a virtual desktop type service workspace 64 is used or where the service is provided primarily or entirely using a computer other than the user computer 50, the user may choose to terminate the user computer connection to the service session while the service operator 60 and, optionally, a supervisor 62 continue to provide service on the service workspace. Where service is still being provided after the user terminates the connection to the service session, the user may establish a connection to the service session after termination to continue viewing the service being provided.

During the course of a service session, the supervisor 62 may optionally monitor the progress of the services provided by establishing a connection to the service session. This preferably allows the supervisor 62 to view the services being provided to the user in the same way as if the supervisor were the service operator 60. The monitoring may be configured such that a supervisor 62 cycles through the service sessions in progress in a predetermined order or that the supervisor is randomly connected to service sessions. In the alternative, the supervisor 62 may be connected to a service session for monitoring using criteria that select certain service sessions. For example, if a service session is taking longer than expected, the supervisor 62 may be connected to determine why the service session is taking longer than expected.

The monitoring may be conducted with notification to the user, the service operator 60 or both. In the alternative, the supervisor 62 may monitor the services provided by the service operator 60 while remaining "invisible" by not providing notification of the monitoring to the service operator, the user or both. This feature is particularly advantageous for providing an additional incentive for service operators 60 to provide high quality service because they do not know if a supervisor is monitoring the service session or not.

In some service sessions, the supervisor 62 may decide to either take over the service operator's 60 role and actively provide service to the user or may decide to provide additional service to the user while the service operator 60 who joined the service session first continues to provide service as well. A supervisor 62 that provides service operator 60 type service during a service session may be referred to as a service operator during the time he or she provides service in the service session.

Figure 33:
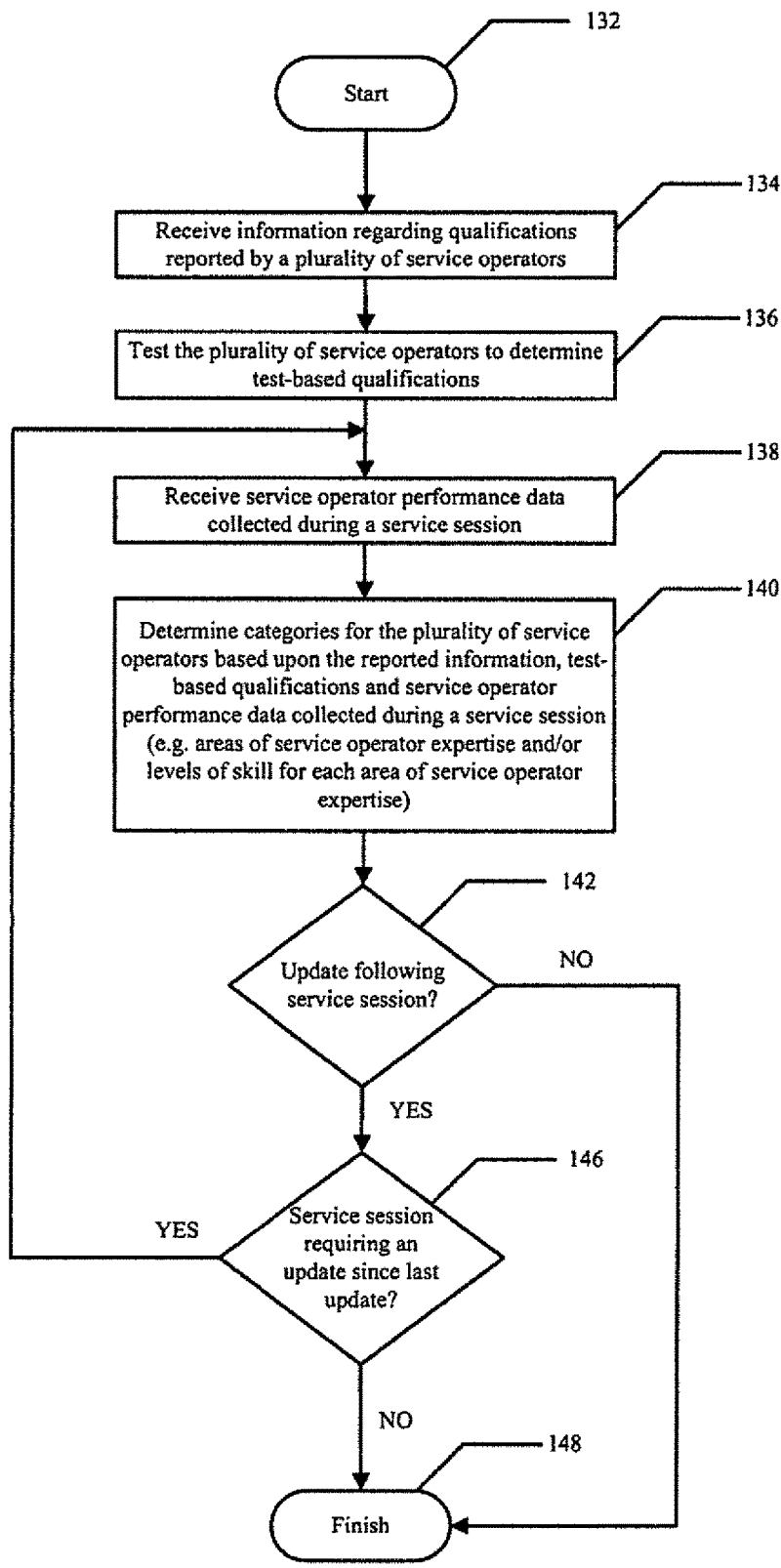
FIG. 33 is a flow diagram showing the automated process for identifying the service needed by a user, and assigning the appropriate service operator to provide the service in accordance with the present invention.

With reference to FIG. 33, a method of categorizing service operators 60 where each operator is capable of providing at least one service in a service session is also provided. The method begins at start (Block 132) and then proceeds to receiving information regarding qualifications reported by a plurality of service operators 60 at Block 134. After receiving the reported information, the plurality of operators 60 is then tested to determine test-based qualifications (Block 136). The service operator 60 testing may confirm that the service operators possess qualifications in the reported area of expertise or level of skill within an area of expertise, and may optionally test for additional areas of expertise or levels of expertise within an area. The service operator 60 reported qualifications and test-based qualifications are preferably obtained before the service operator begins to provide service to users. Additional information relating to qualifications may be obtained by receiving service operator performance data collected during a service session (Block 138). The service operator 60 performance data may include information reported by the user which is preferably obtained at the end of a service session, data collected by one or more supervisors 62 during a service session, data collected by the support server or other data. The service operator 60 data obtained from these sources is then preferably used to determining categories for the plurality of service operators (Block 140). The categories into which the service operators are placed preferably includes both areas of service operator 60 expertise and the level of service operator expertise within an area and may optionally include other information.

After service operators 60 are placed into categories, the categories may be dynamically updated following each service session using the service operator performance data obtained in the session (Block 142). In the alternative, the categories may be updated following a predetermined number of service sessions (e.g., updating after every ten service sessions) or may be updated where performance data from a session would cause a significant change in a service operator's 60 status within one or more categories (e.g., negative user feedback that would cause a service operator to be removed from an area of expertise or would cause the service operator's level of skill to be adjusted downward within an area of expertise). If updates will not be performed following service sessions (Block 142), the method then terminates at Block 148. Where updates are performed following service session, the method checks to determine if a service session requiring update of service operator 60 categories has occurred (Block 146). If so the method preferably returns to Block 138 to receive service operator 60 performance data from the serviced session. In the alternative, the method may proceed back to the start (Block 132) and proceed through the entire method again.

Figure 34:
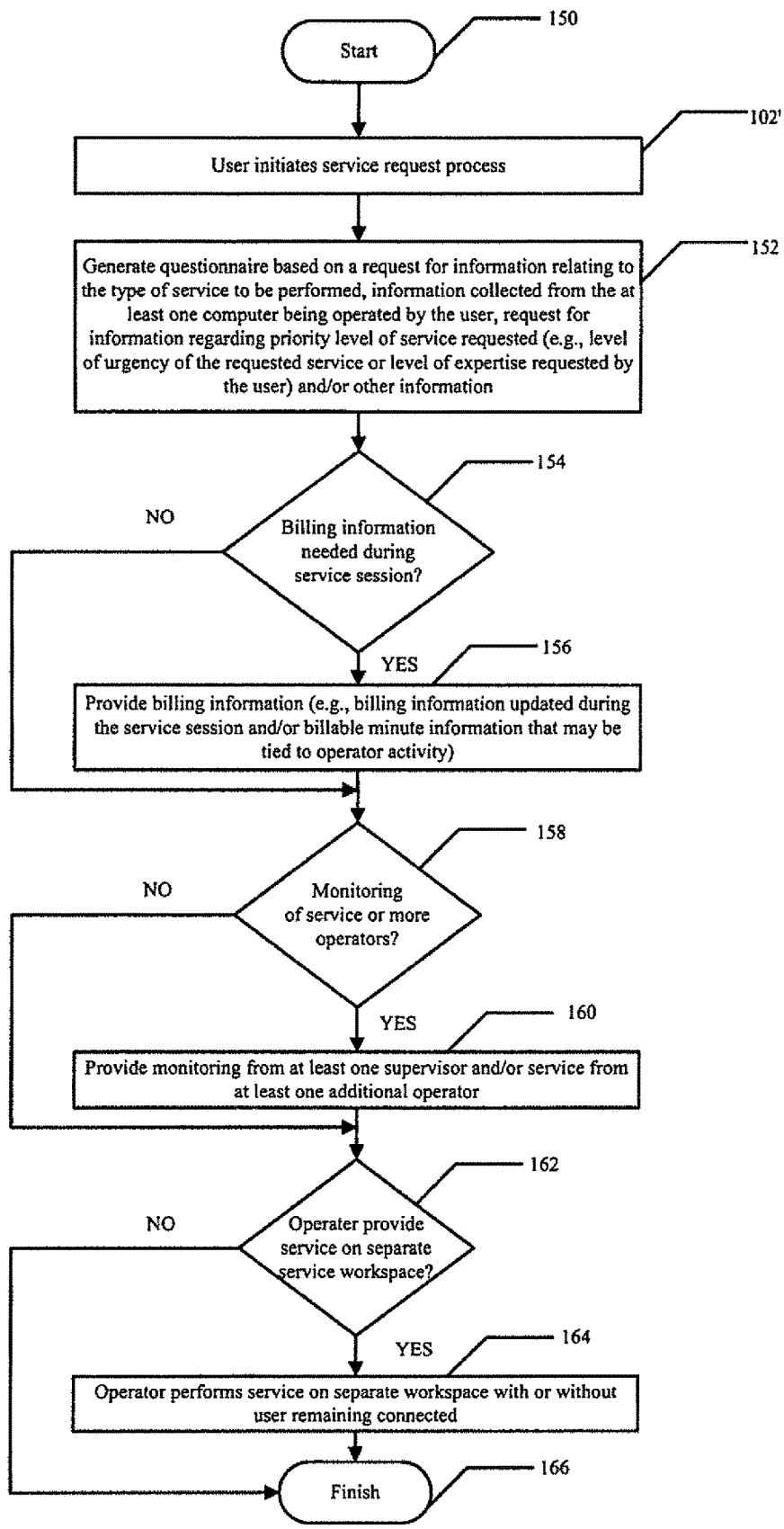
FIG. 34 is a flow diagram showing decisions that may be made regarding questionnaire creation, billing information and service operator and supervisor involvement in accordance with the present invention.

FIG. 34 provides a method illustrating decisions that may be made during service sessions. The series of decisions shown in FIG. 34 are provided for illustrative purposes, do not constitute all the decisions that may be made during a service session and need not all be performed in a service session in the order shown. Moreover, at least some of the decisions such as whether to provide billing information or requiring monitoring may be made by a service operator 60, supervisor 62, the user or by some other individual(s) or a combination of the above. In the alternative, one or more of the decisions may be made "automatically" (i.e., without human intervention) using decision-making criteria put in place before the service session.

The method illustratively begins at start (Block 150) and proceeds to the user initiating the service request process (Block 102'), after which a questionnaire is generated (Block 152). At this point, billing information may be provided during the session or not provided (Block 154). If billing information is provided, it may be provided in a variety of ways (Block 156). After the decision regarding providing billing information, the method continues to decision block 158 where the decision to provide supervisor 62 monitoring or service by additional service operators 60 is made. If monitoring or more service operators 60 are needed, one or both are provided at Block 160. If they are not required, the method proceeds to decision Block 162 where the decision to create a separate service workspace 64 such as a virtual desktop is made. If a separate service workspace 64 is needed, it is provided at Block 164, after which the method may terminate at Block 166. If no separate service workspace 164 is needed, the method terminates at the finish (Block 166).

Categories of Involved Individuals

There are typically four categories of individuals involved in the implementation of the present invention on the service operator 60 side, including a service operator, supervisor 62, executive and administrator. These are preferably not account types, but instead are preferably roles to identify general groups of participants in the system. The present invention may be implemented using less than all of the above categories of individuals.

When the user experiences a problem or otherwise needs service, the user may initiate the support process by requesting help via the agent software module 52 obtained through the company website or some other source. The service operator 60 is preferably an employee/subcontractor of a service provider 56. The service operators 60 are waiting for support requests from customers, and may provide support by chat, voice over IP and by a remote desktop session or other service session. The service operator 60 preferably has limited access to end-user account information to protect end-user privacy. The supervisor is an employee or independent contractor whose responsibility is to overview support process, and to intervene if needed. The executive is preferably a top manager with full access rights in the system. The administrator performs a technical administration role and may be an employee with administrative access to the system. The administrators can preferably change the configuration of servers and other modules.

Service Request Initiation and Processing

One of the most significant advantages of the present invention is the way in which it allocates service operators 60 to the service tasks to be performed with little or no manual intervention from the service provider 56. The support server 54 preferably continuously monitors service operator 60 performance and combines it with user feedback to dynamically adjust service operator 60 access privileges, ratings, and confidence level for each skill area serviced by the service operator. Automating the allocation of service operators 60 to service tasks ensures that the service work is performed more quickly and reduces the overhead involved in human processing of service requests. Most importantly, the appropriate service operator 60 is allocated to the service to be performed.

Figure 3:
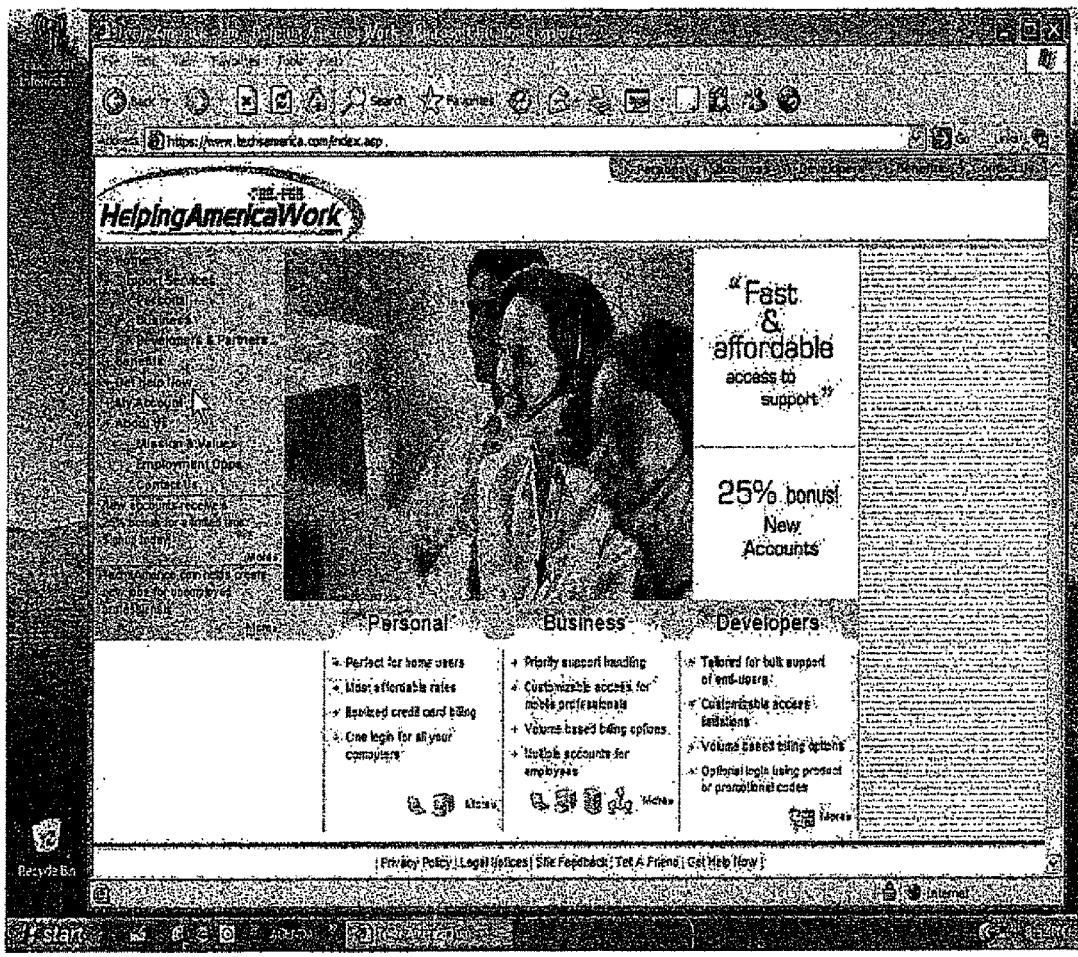
FIGS. 3-7 are screen prints showing the process of obtaining and installing the agent software module on the user's computer in accordance with the present invention.
Figure 4:
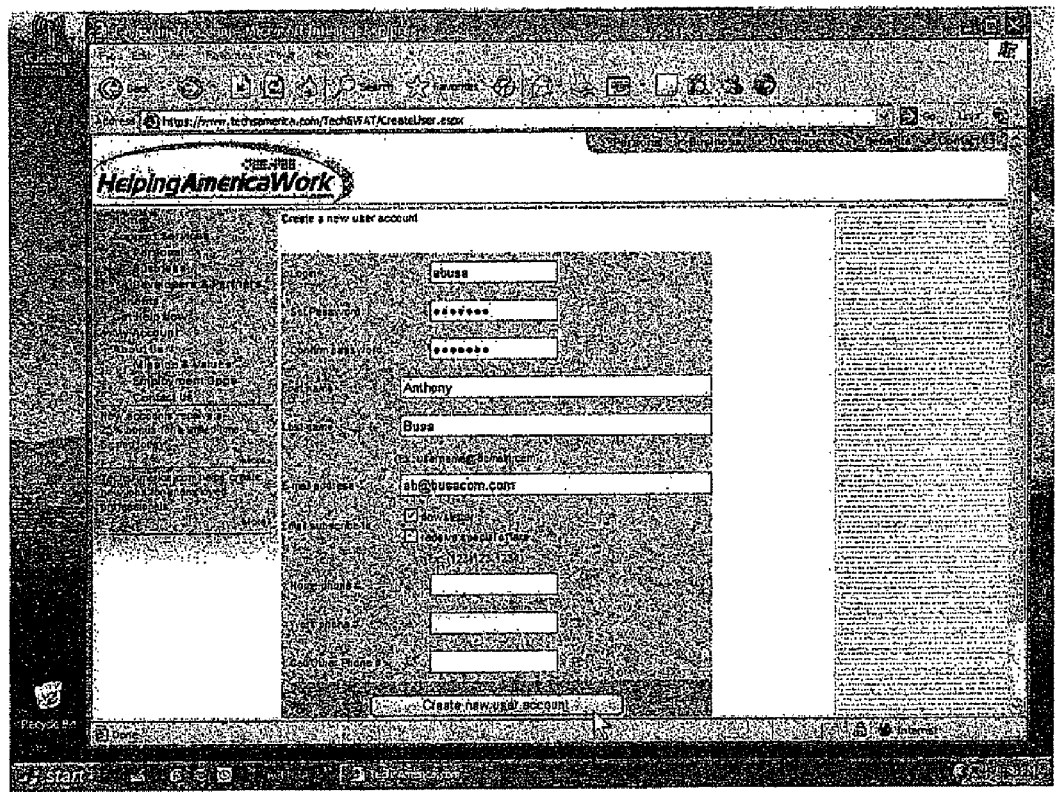
Figure 5:
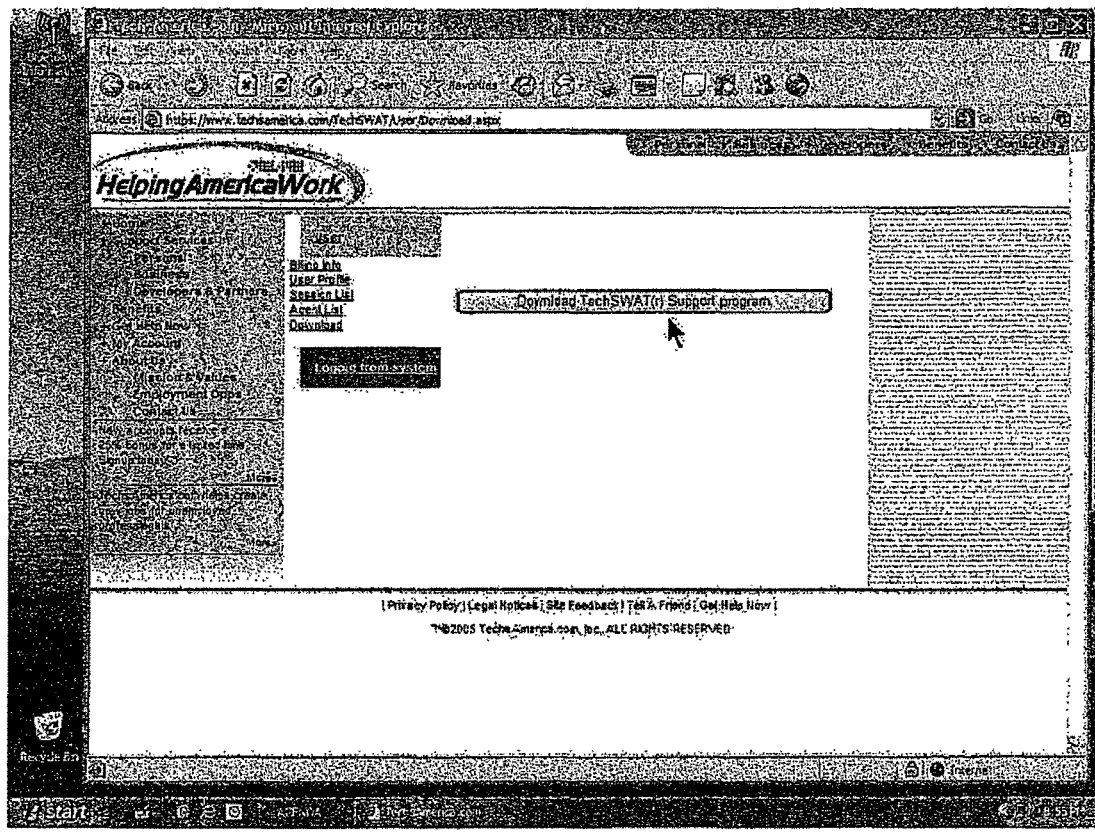

An example showing use of one embodiment of the invention will now be described. If a user has not created an account and downloaded the agent software module 52, the user preferably accesses the web interface (FIG. 3), create the account (FIG. 4) and download the agent software module 52 (FIG. 5). This process is preferably made as "seamless" as possible—so downloading of the agent software module 52 should look like a step in requesting support. The agent deployment package is preferably a single executable file which is downloaded to the User's hard drive. The agent software module may install itself as a Windows service on first run so that it starts every time the system starts. To uninstall it user preferably should run an executable with specific key.

Once installed, the agent software module 52 preferably does not listen on any ports, but instead, remains prepared to initiate a TCP/IP or other connection to the support server, registering upon connection (using its unique Agent ID and login credentials) and waiting for commands. The support server address is preferably built into the agent software module but may be modified.

Figure 6:
Figure 7:
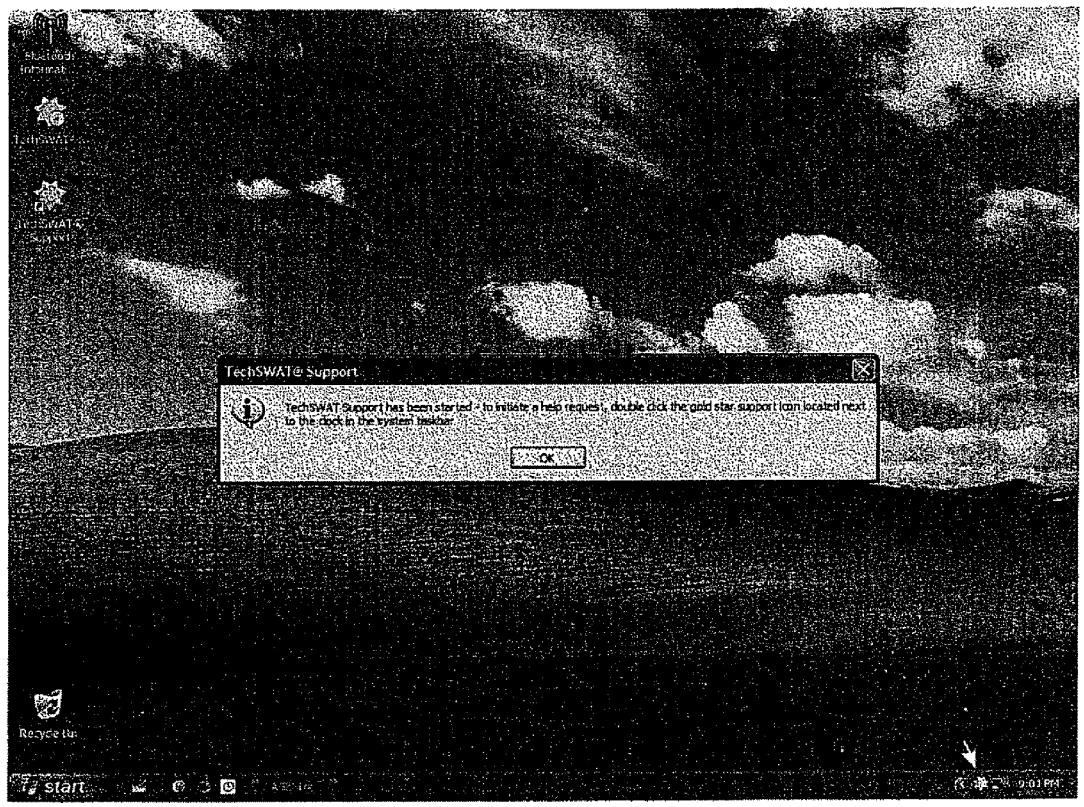
Figure 8:
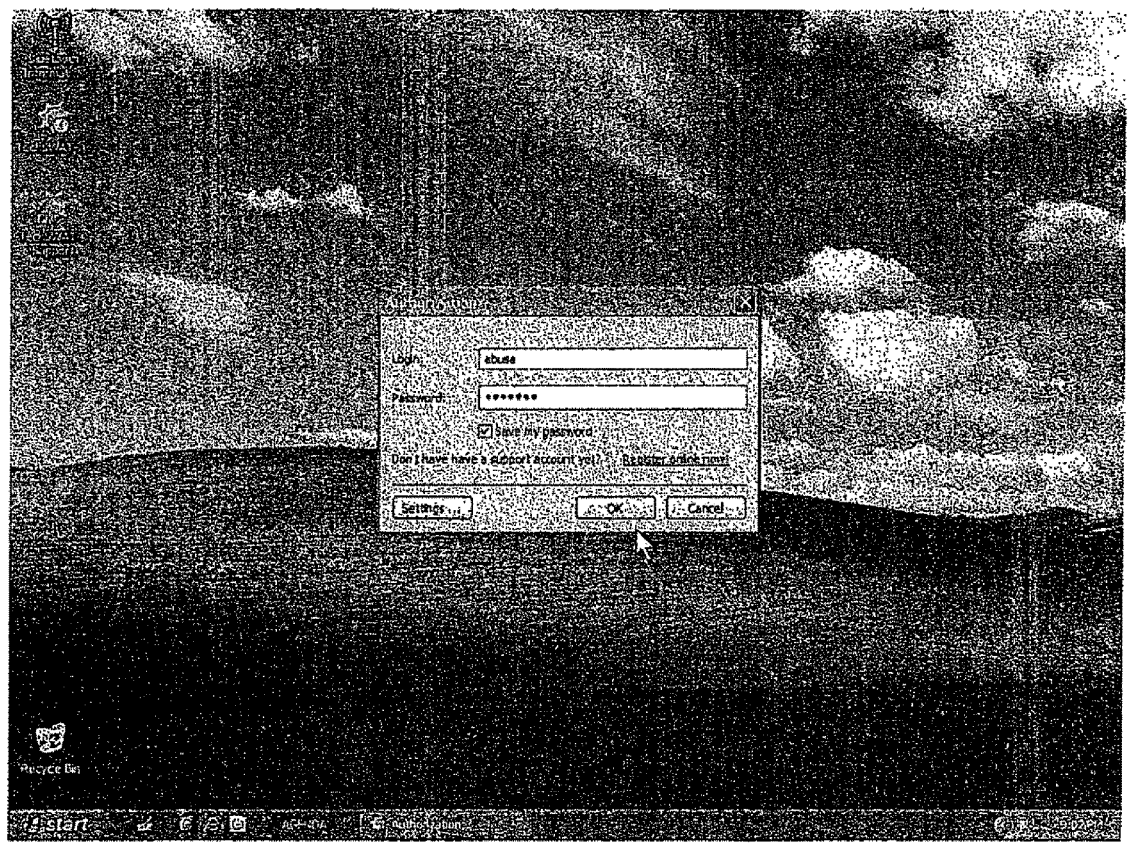
FIG. 8 is a screen print showing a user initiating a service request using the agent software module installed in FIGS. 3-6 in accordance with the present invention.

After installing the agent software module 52 (FIG. 6), the user double-clicks an icon to create a help request (FIG. 7). The icon may be a desktop icon, a tray icon, or some other type of icon.

Because confidential information may be transmitted over the connection between the user and service operator 60, security measures are preferably used to control access to information. For example, the remote desktop connection between the user and service operator 60 is preferably a secure connection that does not allow third-parties to access the information shared between the user and service operator. Similarly, service operators 60 and Supervisors 62 may have different levels of access to user information and other information using adjustable privileges, as will be appreciated by those skilled in the art.

Figure 9:
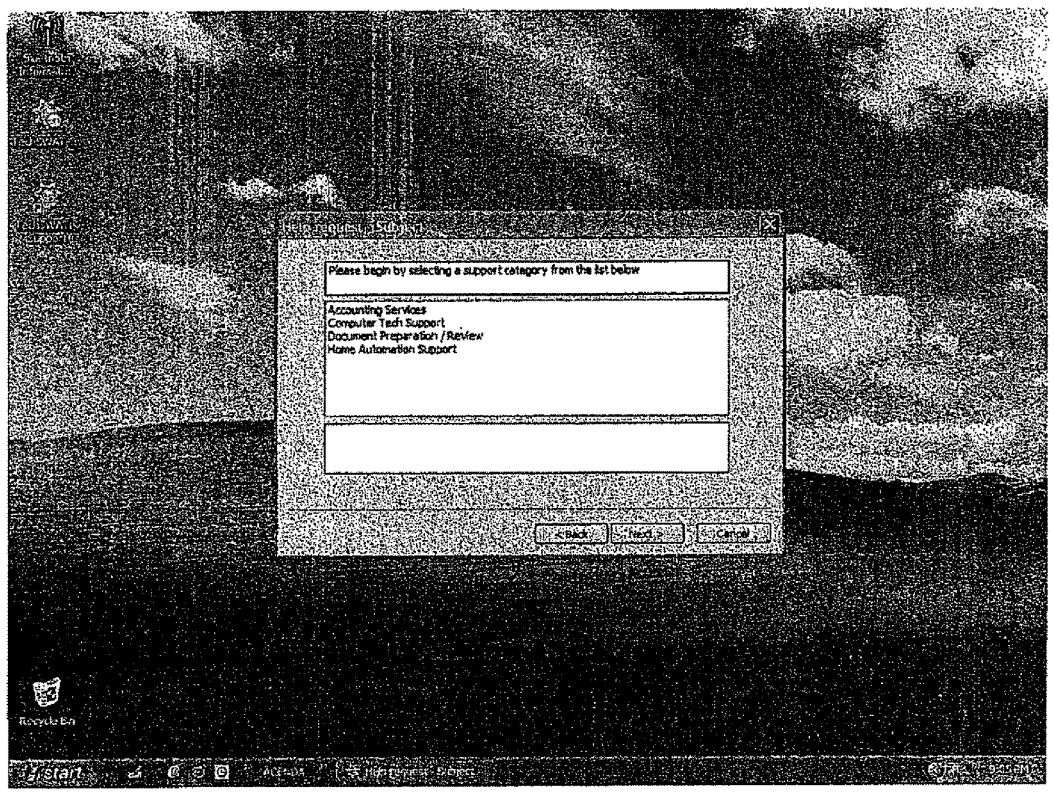
FIGS. 9-15 are screen prints showing one example of the service request wizard being used by a user requesting help with legal document preparation in accordance with the present invention.
Figure 10:
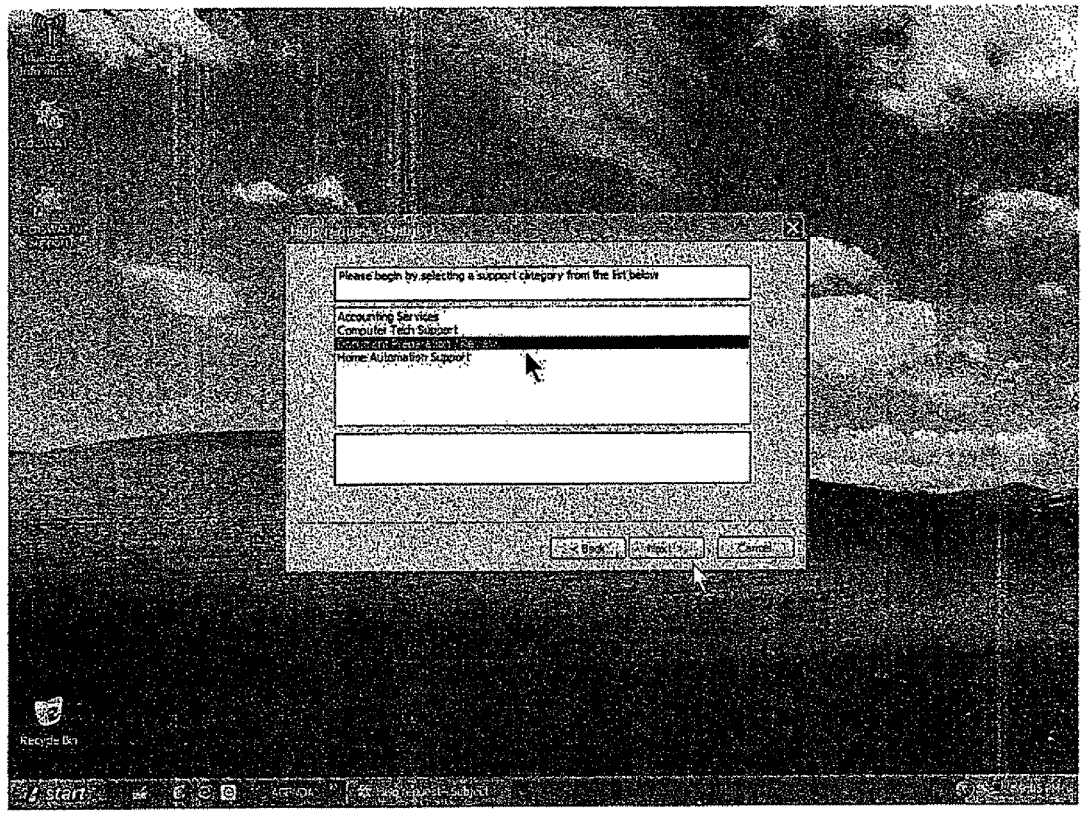
Figure 11:
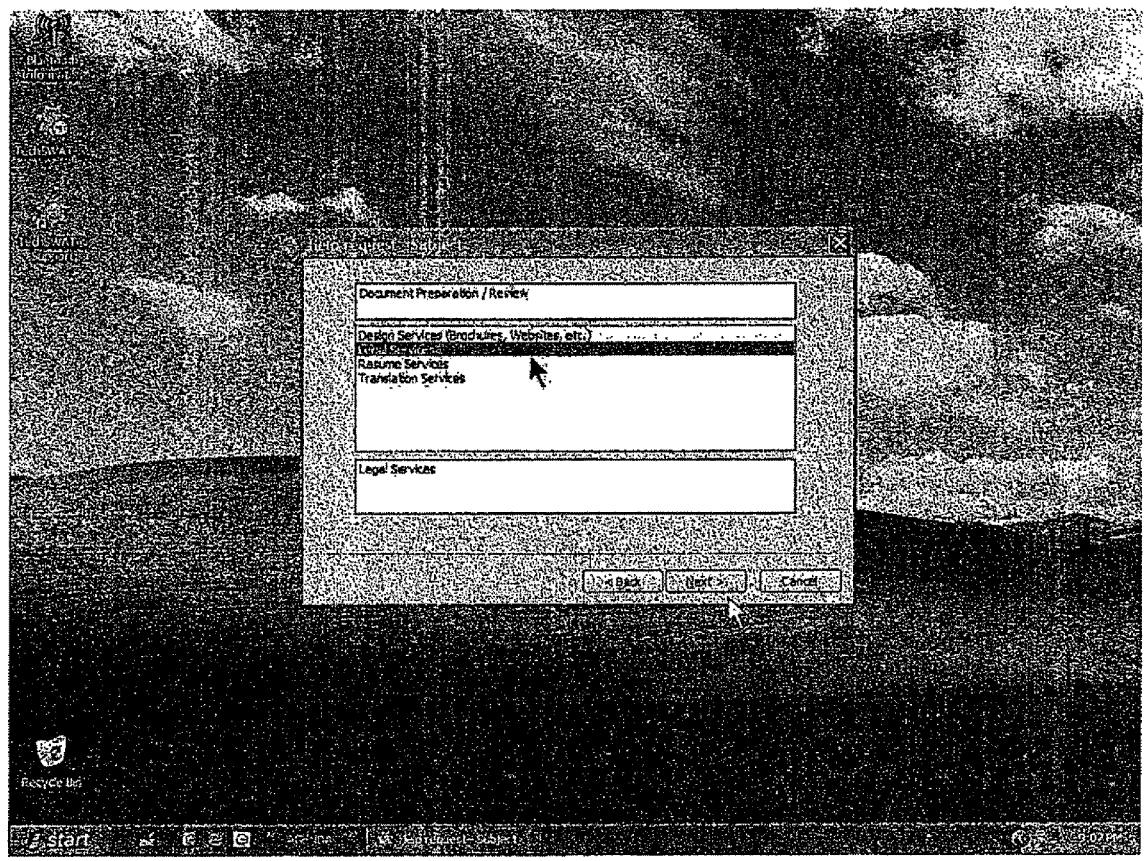
Figure 12:
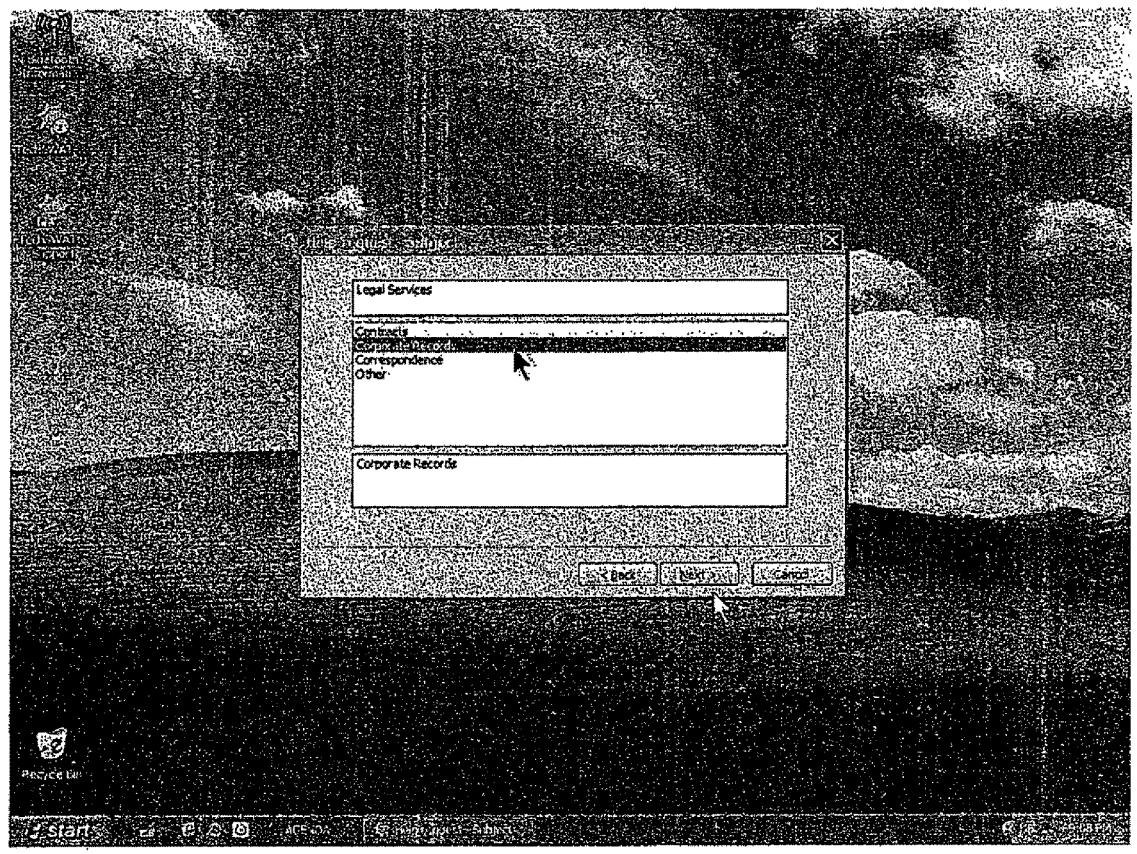
Figure 13:
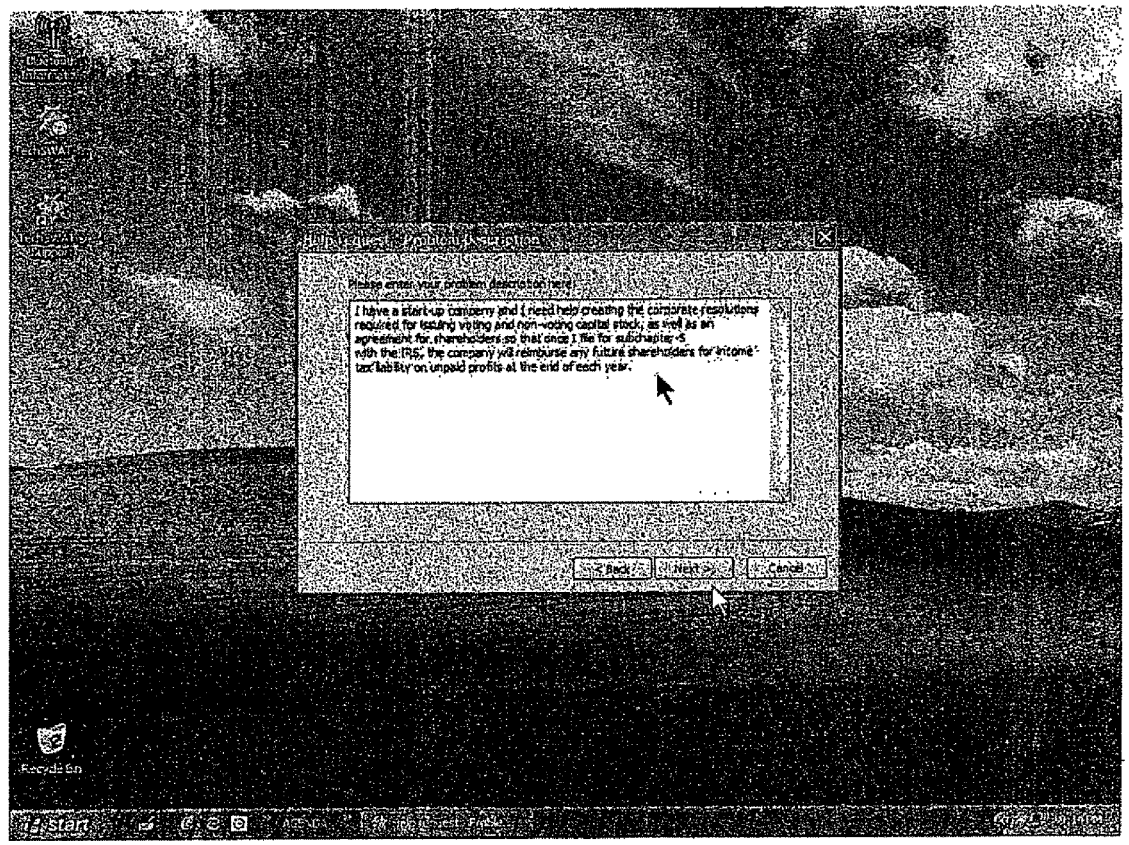

If service of more than one type is available, the user selects the type of support requested as shown in FIG. 9. The user can initiate a help request using the agent software module 52—pressing "request support" icon and using the service request wizard 58. After the user has logged in, the service request wizard 58 allows the user to select from a list or tree of service areas and enters a description of the problem and also select from any applicable billing options presented. FIGS. 9-15 show this service request wizard 58 process to request service with legal documents. FIGS. 16-22 show a similar process to request service regarding a specific problem with the Adobe Acrobat© software application. These different examples are provided to illustrate that the invention is not limited to any particular field of service, and may be used with any service where remote access to a user's computer 50 would be advantageous.

The requests for the type of service needed at FIGS. 9-12 and 16-18 show relatively sophisticated users who understand the specific area in which they need service. Different service request wizards 58 may be necessary for other users that know they need service but are not sophisticated enough to know the specific area of service needed. A computer technical support example will illustrate how this works. A user initiates a service request as described above because his computer applications are malfunctioning or "crashing" (i.e., rendered temporarily unusable). In this situation, the service request wizard uses the computer's current hardware and software inventory lists and crash logs to cross reference known bugs and interoperability issues, and then 58 asks a series of questions designed to narrow down the potential causes of the problem before a service operator 60 is assigned to the service request. The questions asked by the service request wizard 58 will typically be of the type that a service technician would ask when responding to a service request. Many of the questions are likely to be questions to which yes or no are appropriate answers while other questions may ask the user to enter in an error message received or other information describing the service desired which may then be matched to a list of error messages or other criteria to identify the potential problem.

The service request wizard 58 can also "monitor" problem definition progress, and if additional detailing is not necessary to make best selection from available service operators 60, the support server 54 notifies the user and routes the call to the appropriate service operator 60. Further flexibility may be provided by utilizing chat-only service operators 60 to provide Tier-1 problem identification assistance and answers to basic questions, as well as routing to appropriate service operators 60.

Automating this process of identifying the problem with the service request wizard 58 provides several advantages. First, the user is preferably not billed for support service based on time during the service request wizard 58 process, thus saving the user money. Second, once the problem is identified using this automated process, a single appropriate service operator 60 is preferably assigned to fix the problem. Identifying the problem first avoids a scenario where one service operator 60 is connected to the user and identifies the problem, but another service operator 60 has to be assigned to fix the problem. If such a situation does occur, the first service operator 60 places the user back in the queue to be routed to the next available service operator 60 with the right skill set to fix the problem. Third, the service operator 60 preferably is only connected once the specific problem or area of the problem is identified, thus reducing the amount of time necessary to solve the problem.

Figure 14:
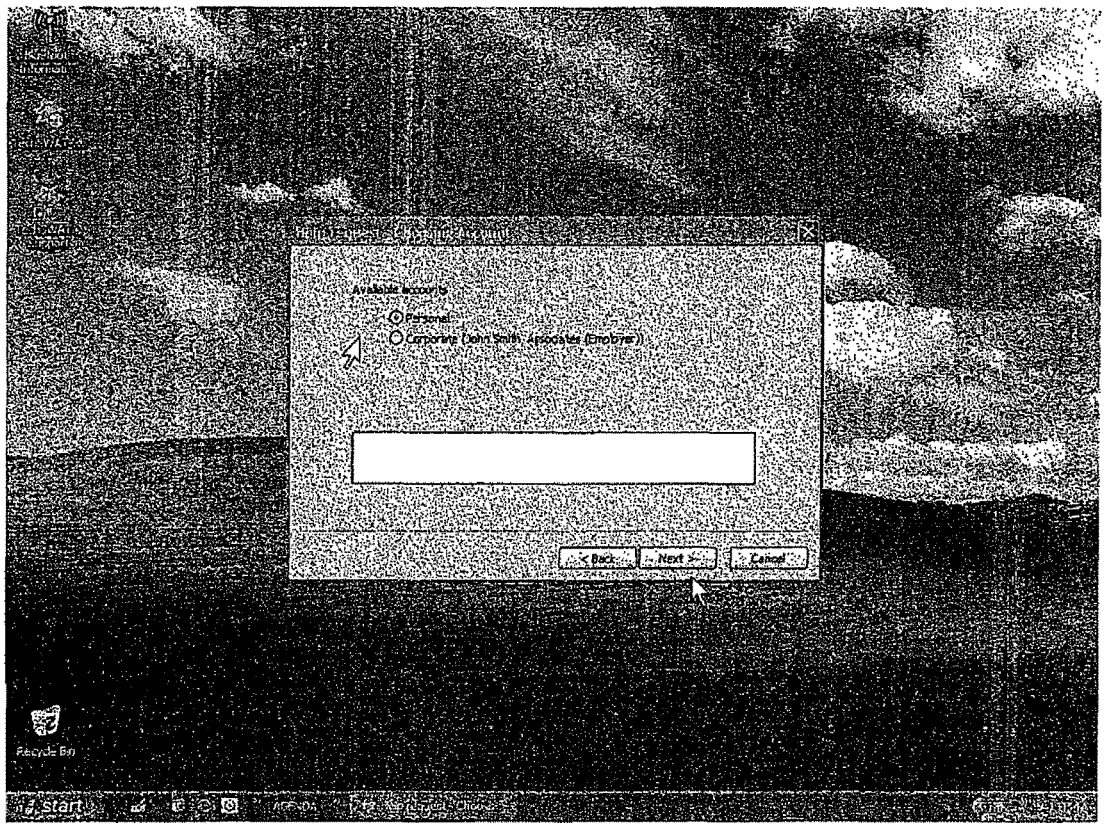
Figure 20:
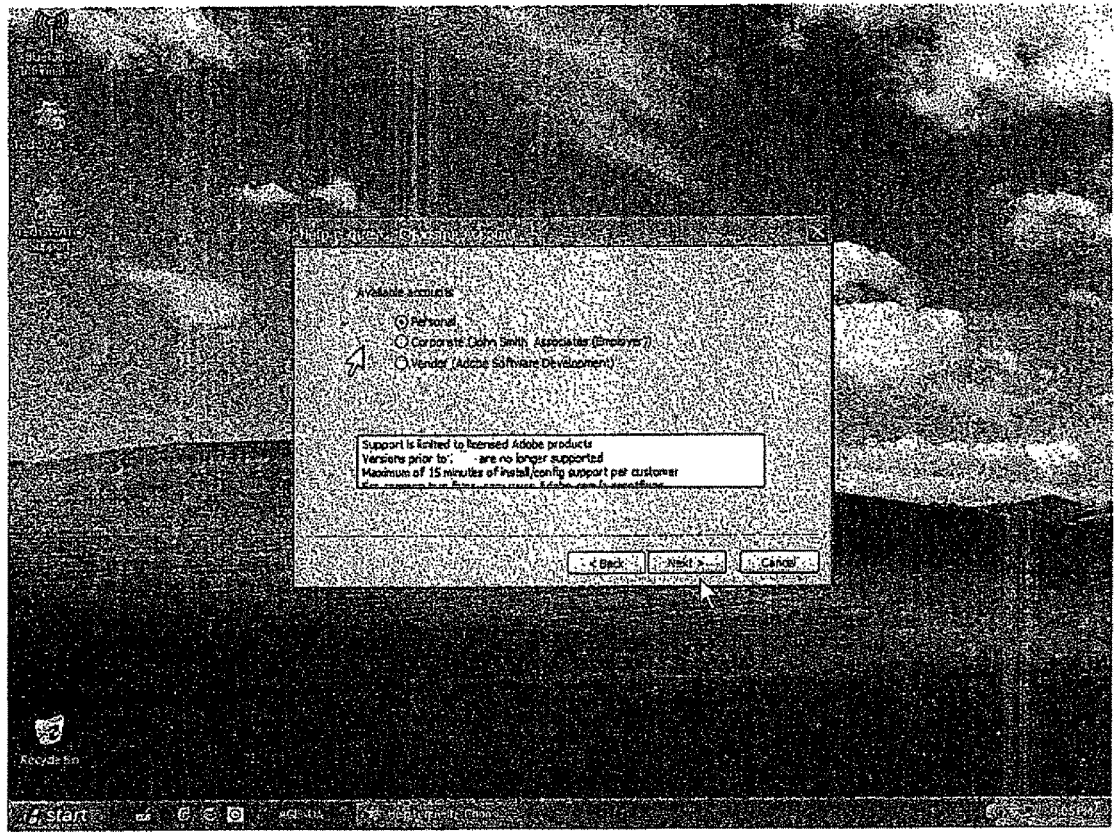

There are a number of situations in which a user may have multiple accounts, such as a personal account paid for by the individual, and a corporate account paid for by the individual's employer. If the user has access to more than one account, the user will then preferably be asked to select the appropriate account for billing purposes (FIGS. 14 and 20).

Figure 21:
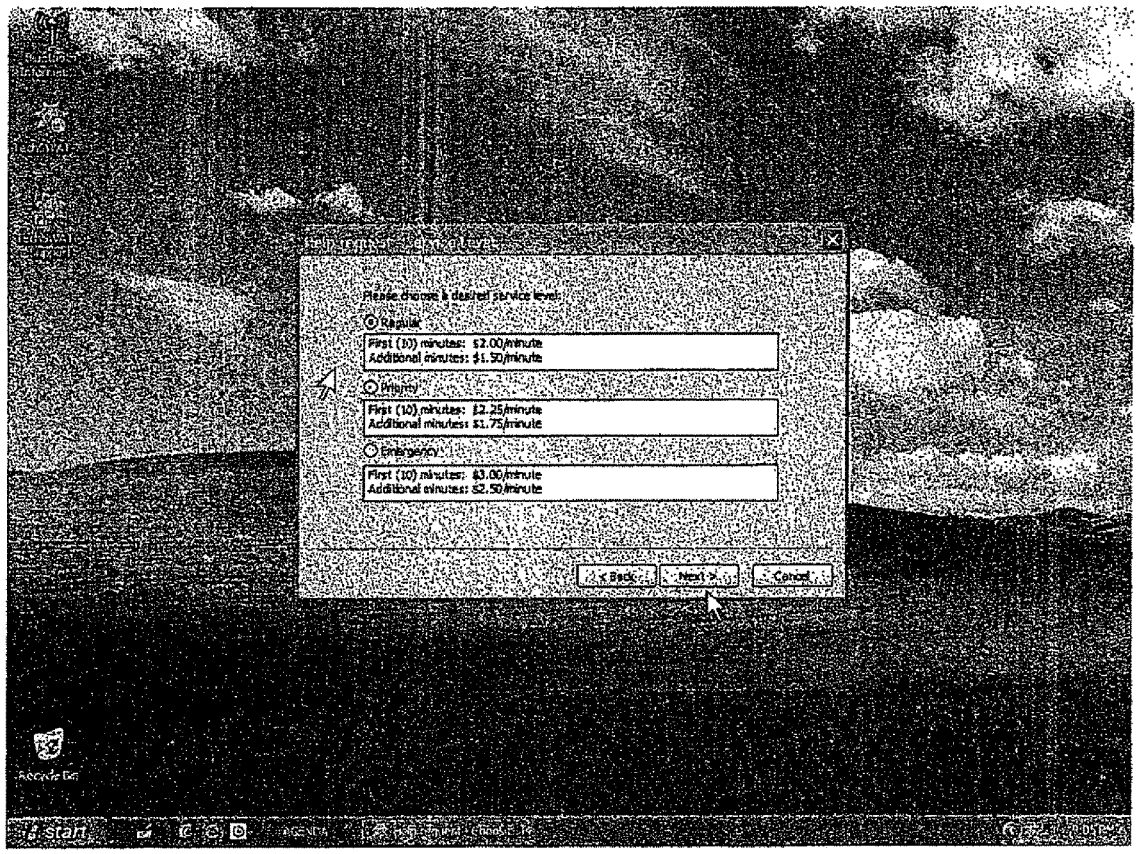

If multiple levels of support are available, the user will then be prompted to choose the desired level of service (FIG. 21). FIG. 21 shows a three-tier "regular," "priority," and "emergency" set of service options. The "regular," "priority," and "emergency" rates may correlate to Tier-1, Tier-2, and Tier-3 qualified support service operators 60. A greater or lesser number of service priority options may be provided, depending upon the type of service being provided. The higher priority, typically more expensive, service options may provide one or more of several advantages to the user. Higher priority service requests may be routed to more experienced service operators 60. Higher priority requests may also provide more rapid access to service operators 60 during periods of heavy service request volume. When service requests are received from a user, the request is preferably transferred to the appropriate service operator 60 immediately. During periods of heavier request volume, the request is placed in a queue to await the next available service operator 60 with the appropriate skills to provide the requested service. The queue is handled on a first come, first serve basis, with the appropriate service operator 60 being connected to the first user requesting service. Requesting higher priority support may allow the user to have access to a service operator 60 even though lower priority support requests that were made earlier in time are still in the queue.

Figure 15:
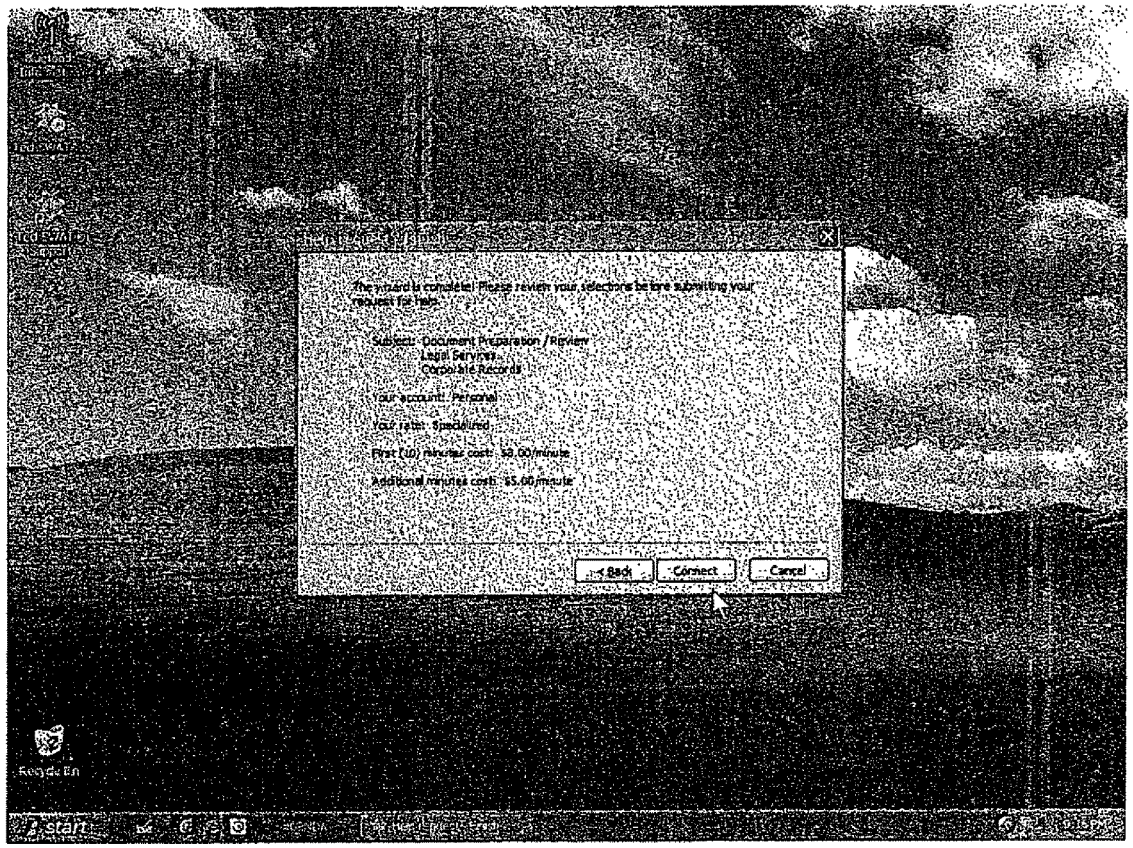
Figure 16:
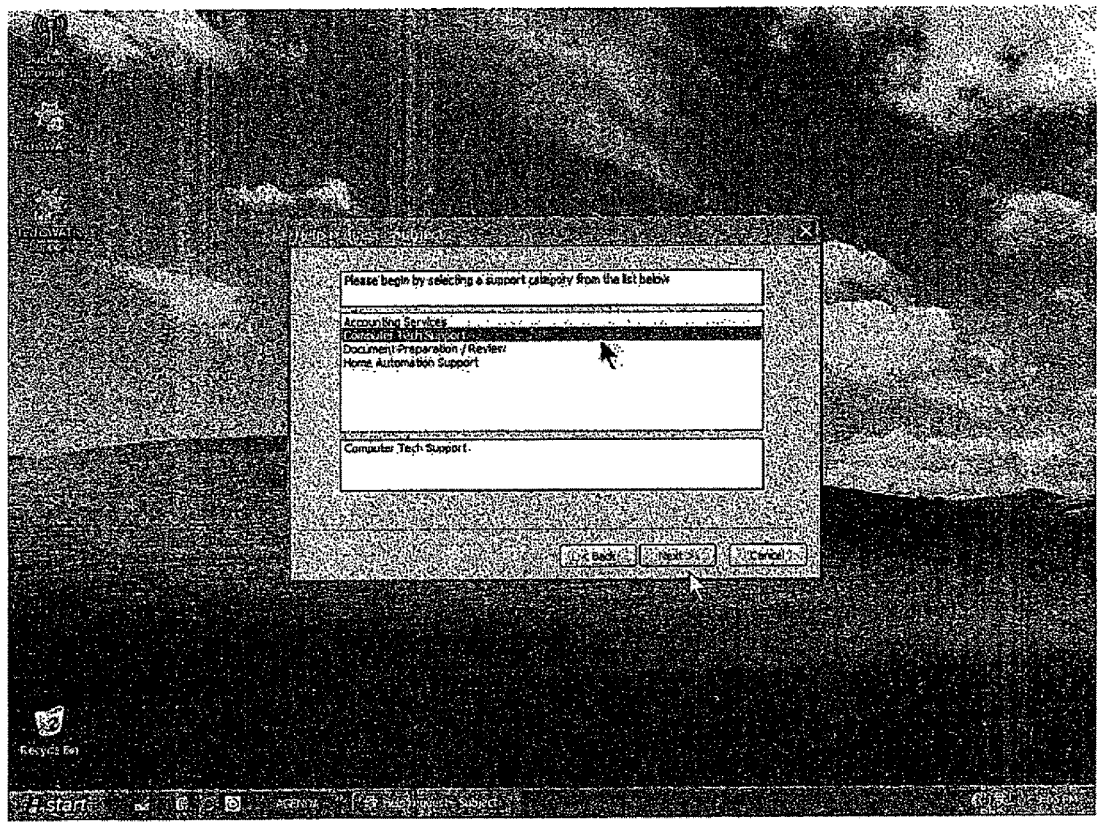
FIGS. 16-22 are screen prints showing another example of the service request wizard being used by a user to request help with a specific software product in accordance with the present invention.
Figure 17:
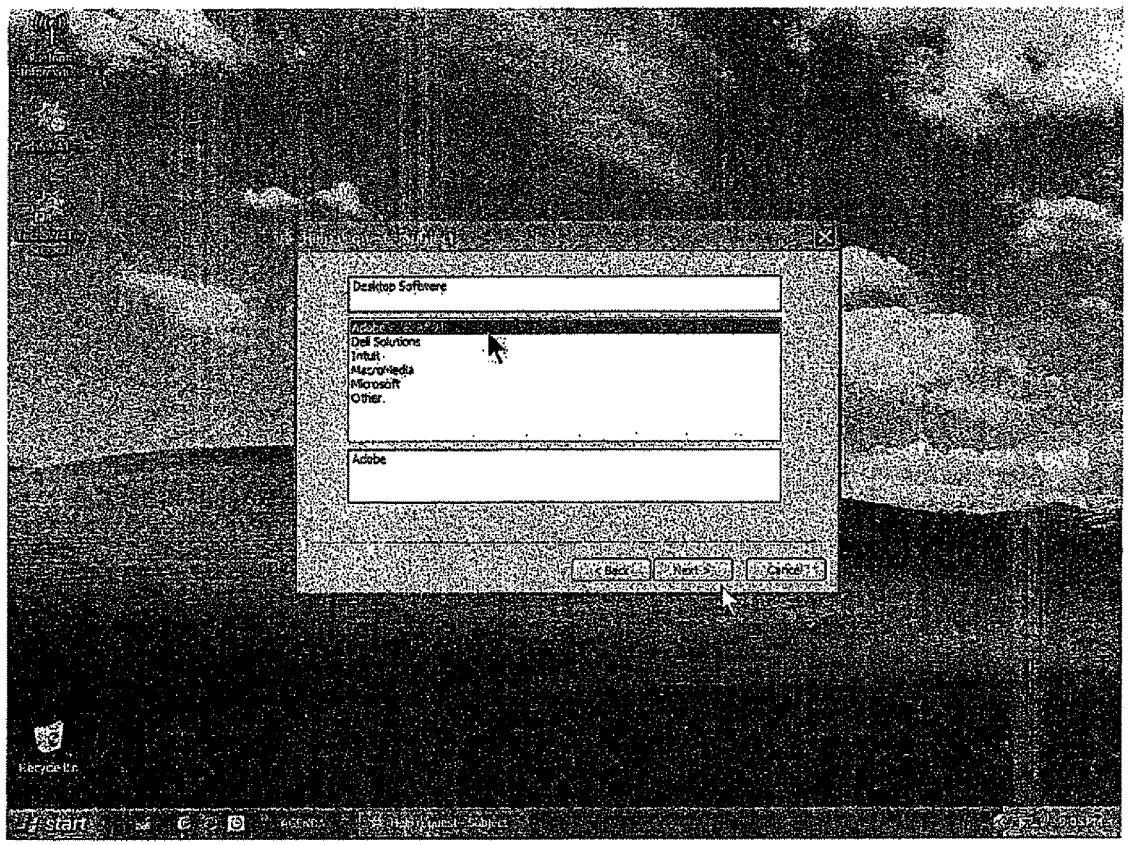
Figure 18:
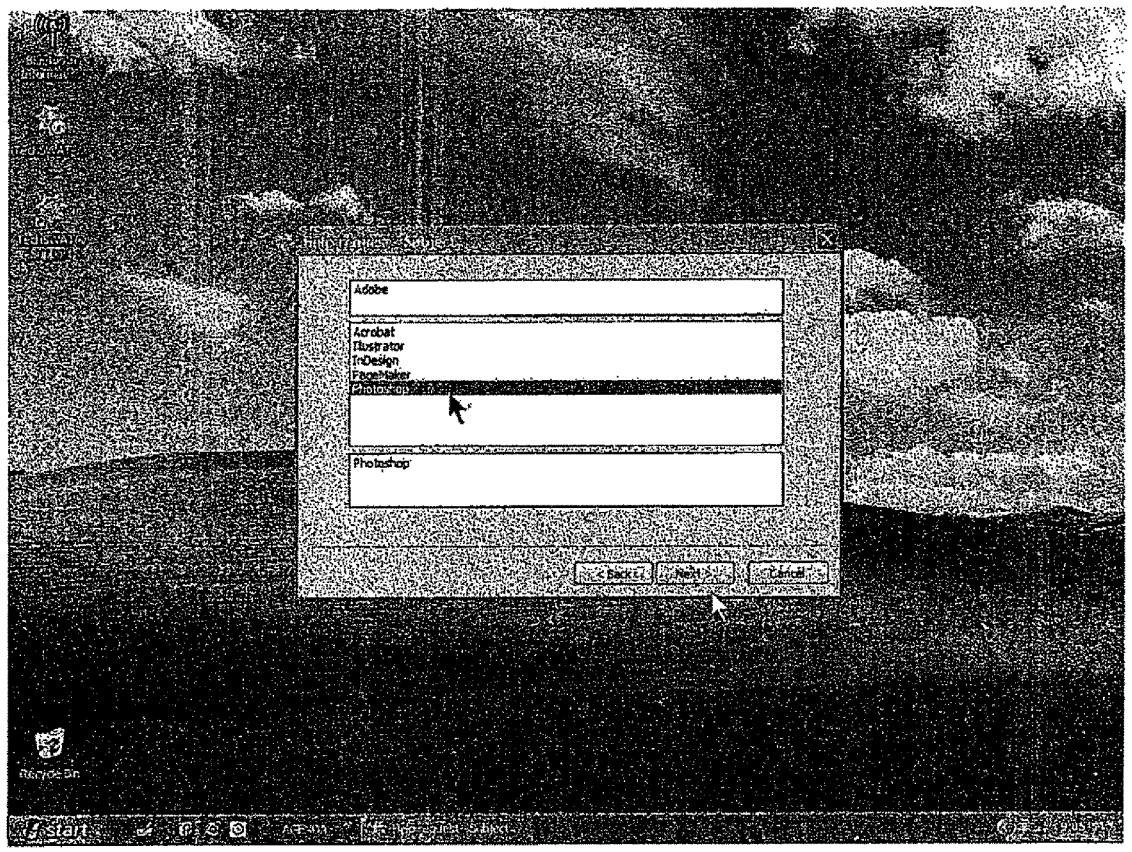
Figure 19:
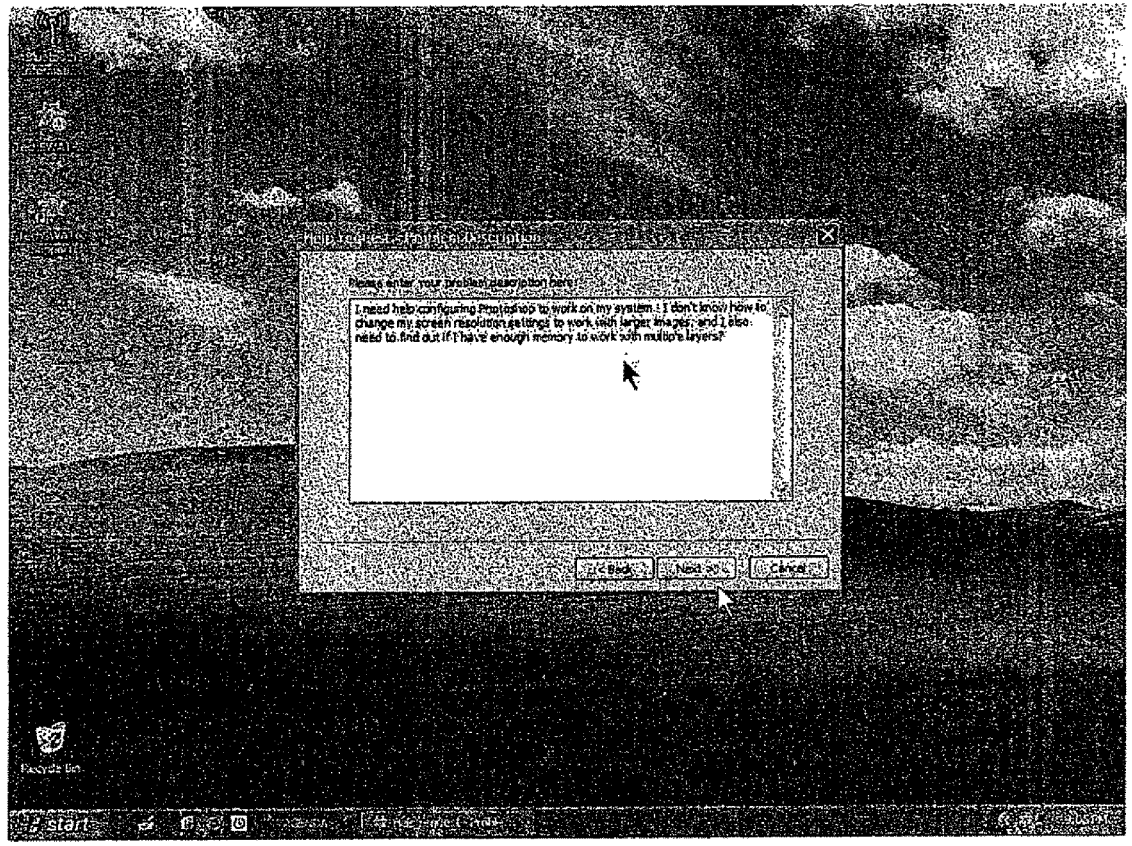
Figure 22:
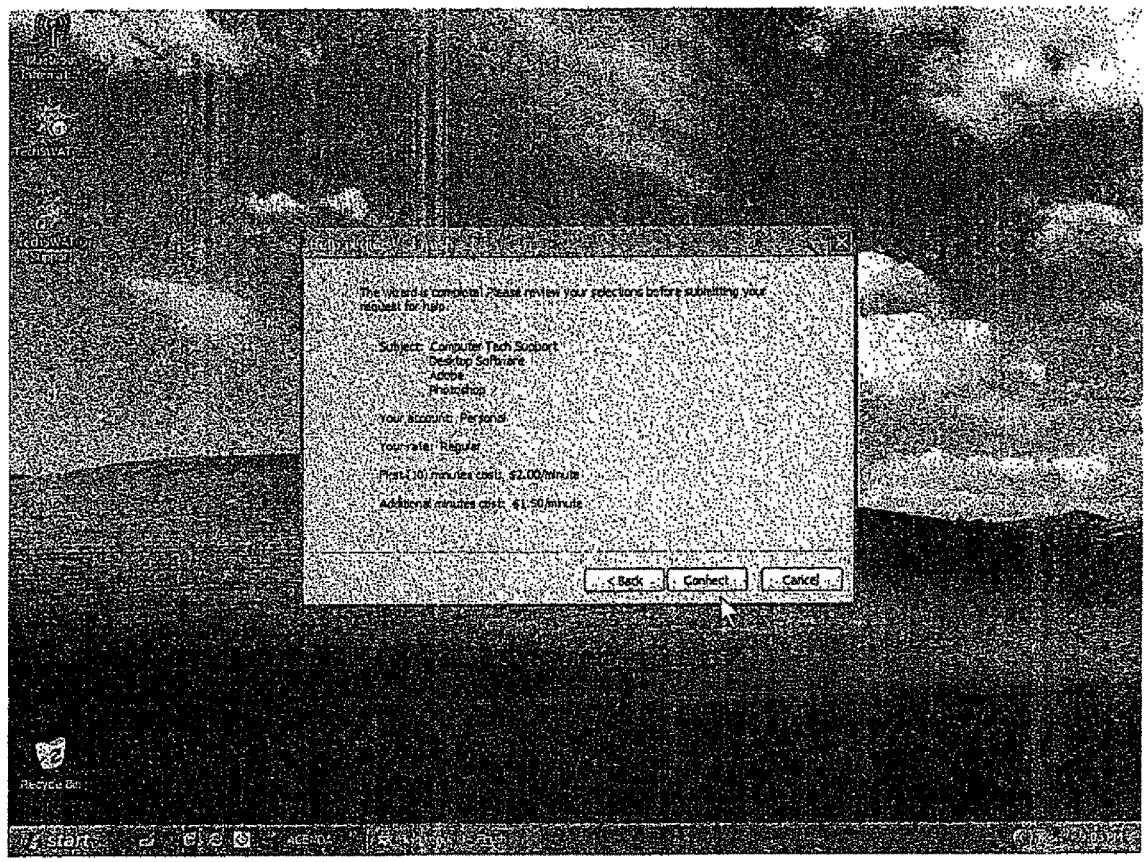
Figure 23:
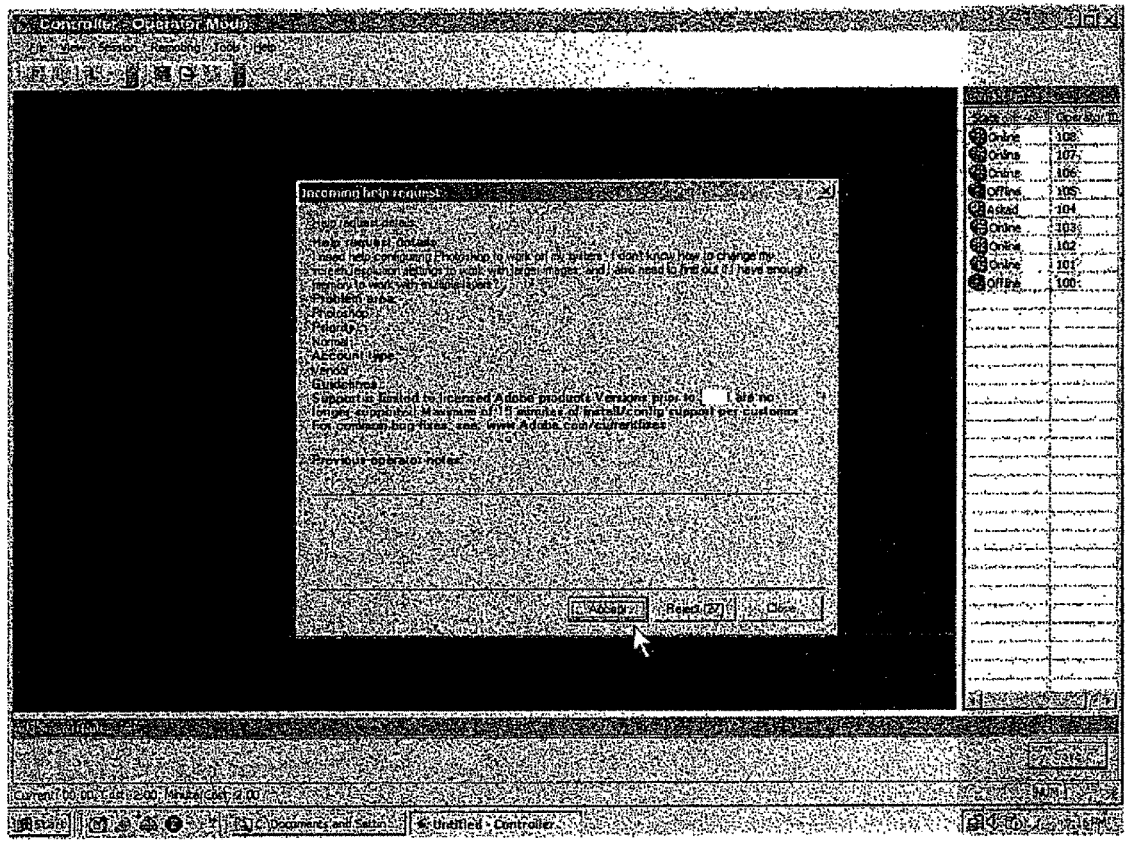
FIGS. 23-28 are screen prints showing the appropriate service operator communicating with the user and establishing a remote desktop connection in accordance with the present invention.

Once the user has entered the information necessary to identify the problem and the user has selected from any applicable billing options presented, the user is preferably presented with a summary screen to summarize the billing details and information gathered by the service request wizard 58 (FIGS. 15 and 22). After reviewing the summary information, the user then agrees to be connected to the appropriate support service operator 60 using criteria described below. The appropriate service operator 60 receives the user's request for service and accepts the request (see FIG. 23 showing the service operator's 60 computer at the time the request is received). To handle situations where the service operator 60 has stepped away from their workstation, as well as to enable re-routing of requests that include manual description which the service operator 60 feels inexperienced to handle, the service operator 60 has the option not to accept the support request, or the control module will automatically reject the support request and log off the service operator, preferably after a 15 second time-out period has elapsed. Where the service operator 60 rejects a request, the service operator preferably enters a reason for the rejection.

When the service operator 60 agrees to handle the service request, several options are available. The service operator 60 may be immediately connected to the user's computer 50 using remote desktop software similar to the remote desktop software described in the background above.

Figure 24:

Because many users are not immediately comfortable with another individual being able to control the user's computer 50 so quickly, intermediate steps may be provided. For example, the user may be prompted to accept the service session (FIG. 24). If the user takes no action, the support request preferably terminates automatically. In the example provided in FIG. 24, the "reject" button is counting down from ten seconds. At the end of ten seconds, the support session request will be automatically rejected unless the user takes some action. Other time periods may be appropriate depending on the nature of the services being provided or the type of user.

Figure 25:
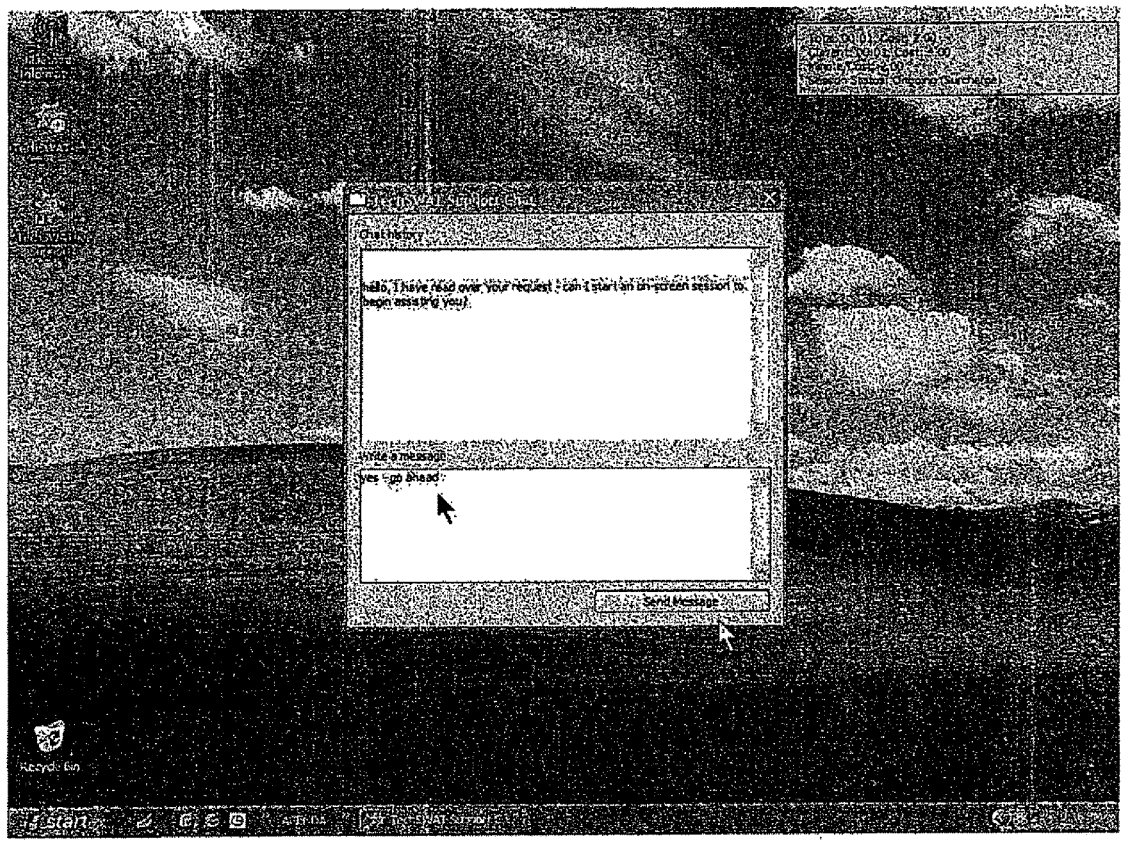
Figure 26:
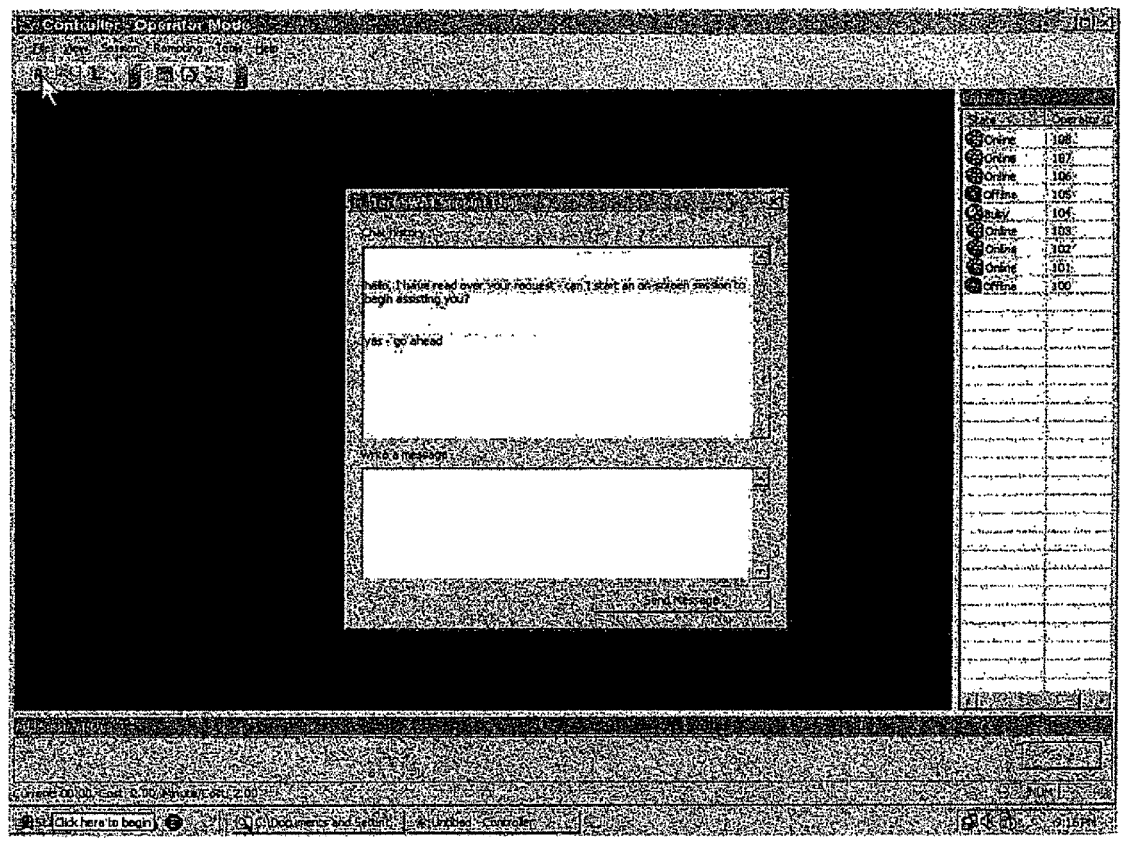

A further intermediate step may be provided where the service operator 60 chats with the user, as shown in FIG. 25, before establishing a remote desktop session. The chat may be used to further identify the service needed and confirm that the service operator 60 has the appropriate skill set to provide the needed services. FIG. 26 shows the chat session from the service operator's 60 computer.

Figure 27:
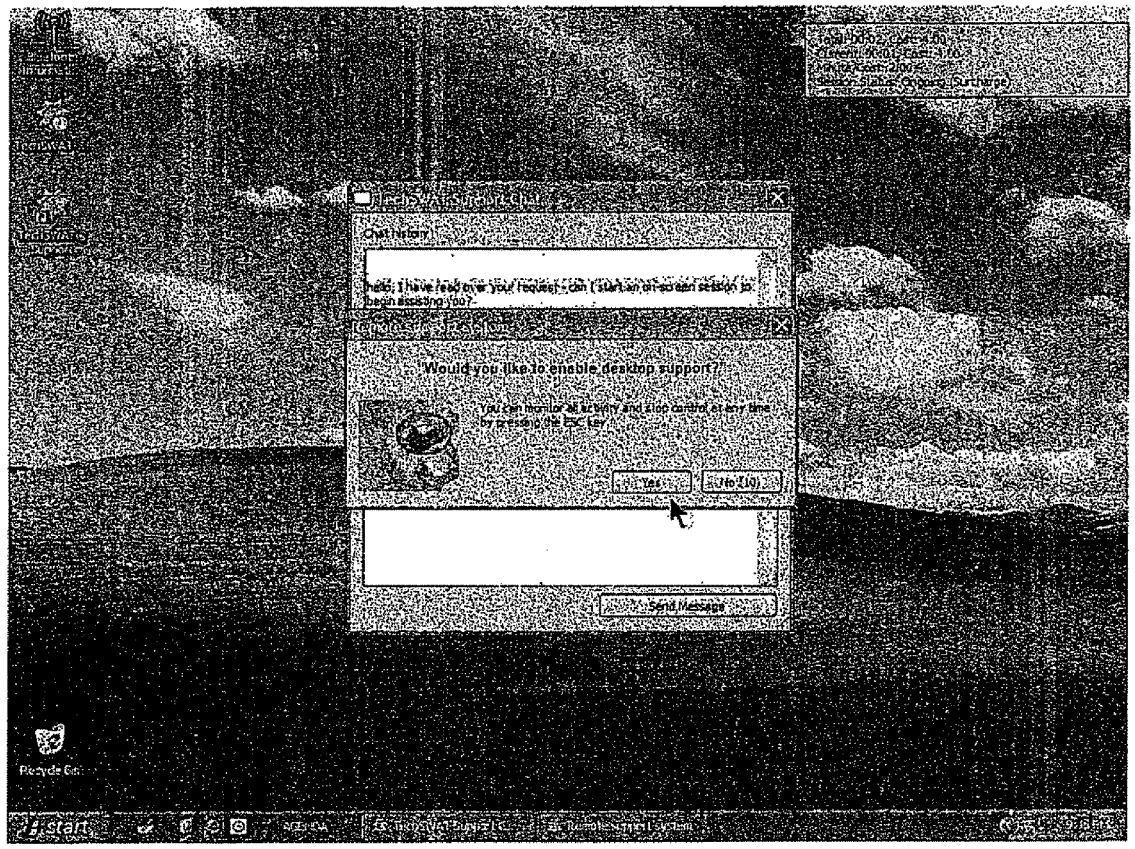
Figure 28:
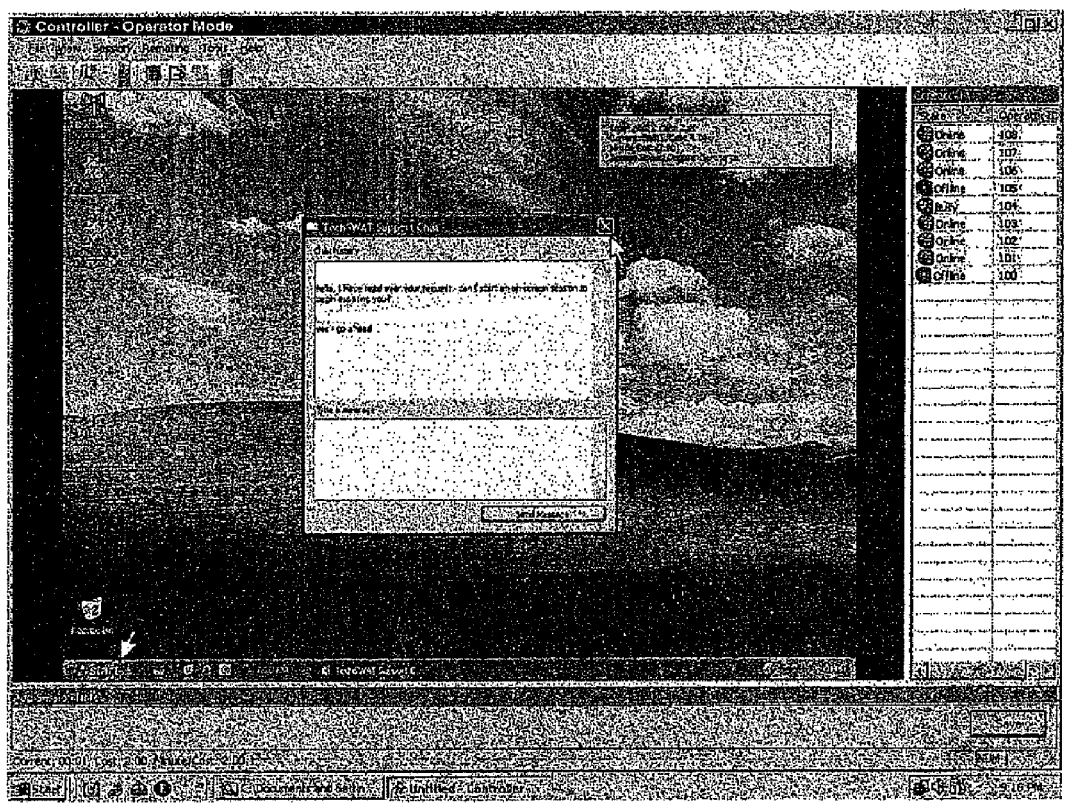

FIG. 27 shows the service operator 60 prompting the user to establish a remote desktop session. The remote desktop session prompt preferably has a time that will reject the request automatically if no action is taken. Once the remote desktop session is established (FIG. 27), the service operator 60 can then take action on the user's computer 50 as if they were sitting right in front of it, enabling the service operator 60 to provide highly-effective service to the user.

The user preferably has the ability to terminate the remote desktop session at any time by taking an action such as pressing the "Esc" (escape) key on the user's keyboard. The session may also be terminated at any time by the service operator 60. Easy service session termination allows the user to feel more comfortable about receiving services over a remote desktop connection.

Figure 29:
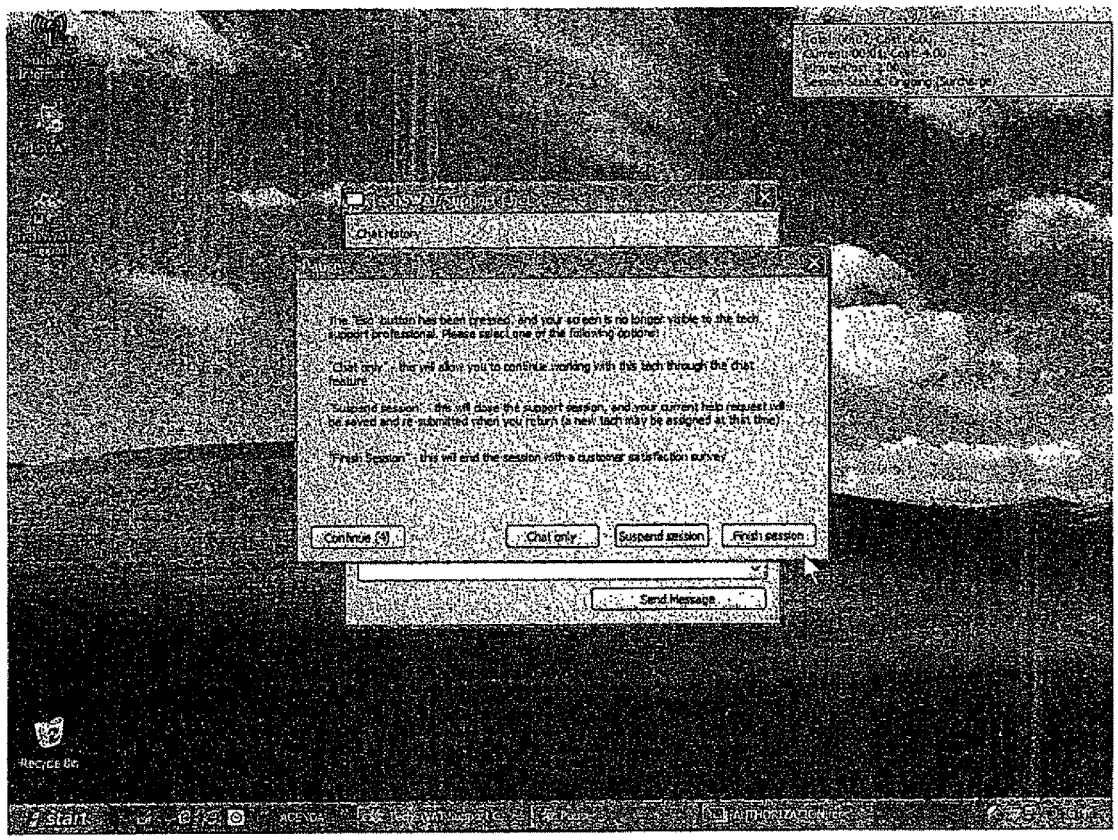
FIGS. 29-30 are screen prints showing the end of the service process and feedback being provided by the user in accordance with the present invention.
Figure 30:
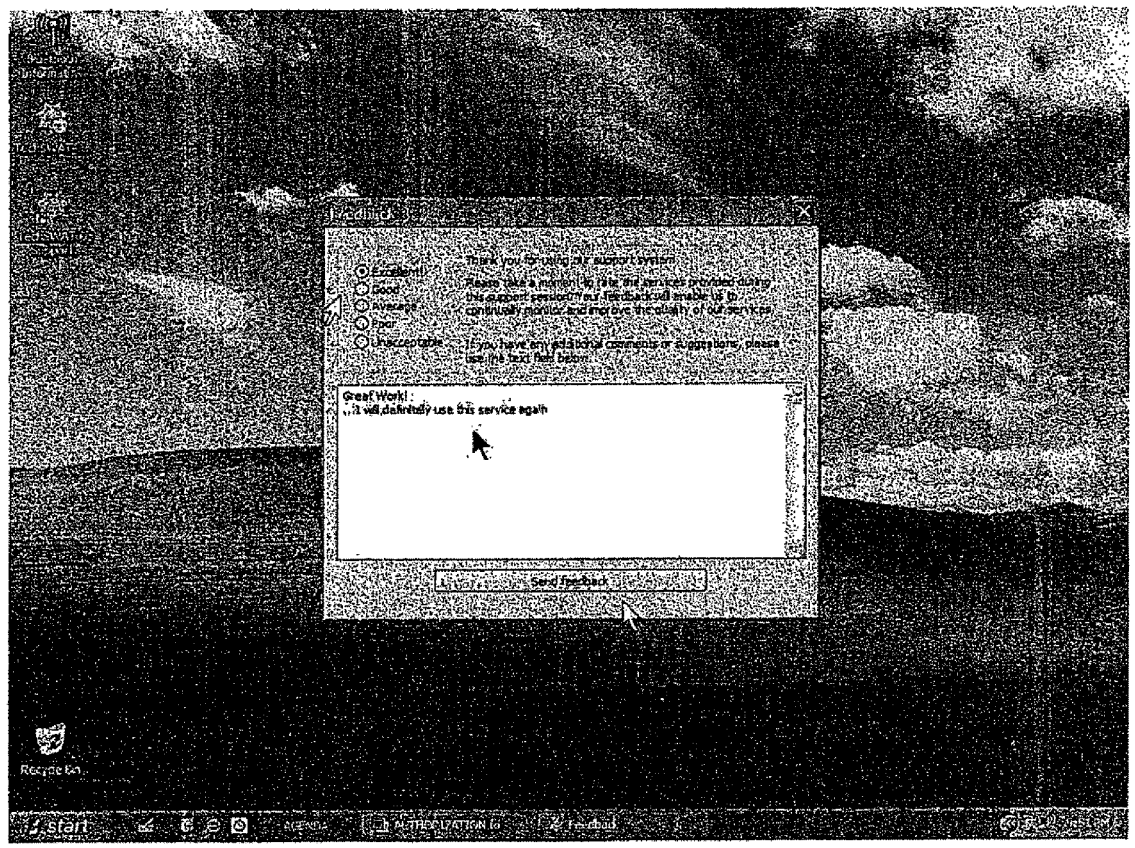
Figure 31:
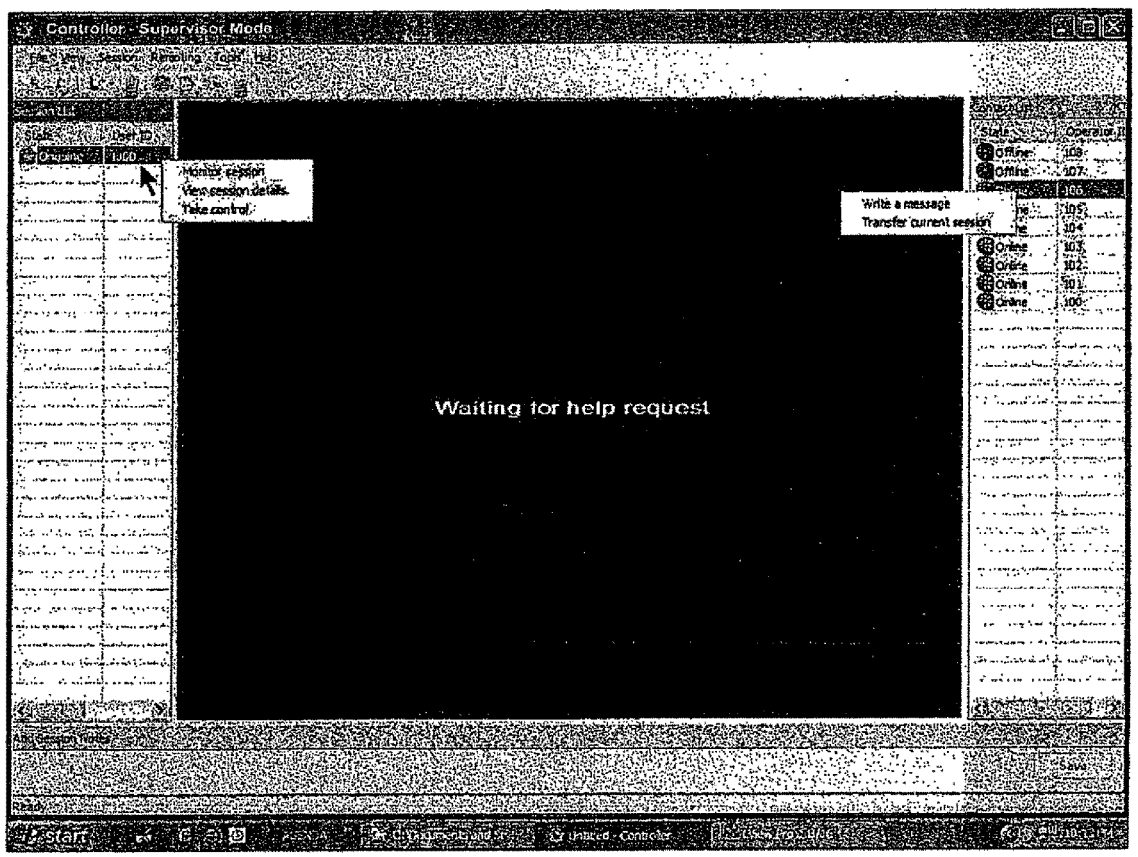
FIG. 31 is a screen print showing the supervisor interface with an overview of all operator activities and current service requests in accordance with the present invention.

After the service operator 60 has provided the requested services, the service session may be terminated by either the user, the service operator 60, or a supervisor or administrator for the project (FIG. 29). After the service session is terminated, the user may provide feedback, as shown in FIG. 30, regarding the service session. After the service session is terminated, the service operator 60 returns to await the next user requesting support in that service operator's 60 area of expertise (FIG. 31).

The administrator and supervisor 62 preferably have all the abilities available to the service operator 60, as well as additional abilities described in more detail below. Once the service session is accepted and the service operator 60 is devoting service time to the user, the user begins to be billed for service time as shown by the billing summary box in the top right corner of FIG. 25. The billing preferably begins as soon as the service operator 60 is providing service time, whether by remote desktop connection, chat client, voice over IP or other connection.

The billing may be charged in any time interval and preferably on a minute-by-minute basis instead of the larger time intervals such as hour, half-hour, or quarter-hour used in traditional billing practices. Automated minute-by-minute billing provides a number of advantages. First, the service operator 60 is not required to manually track service time, an activity which can occupy a substantial portion of a service operator's time. Second, minute-by-minute billing provides highly precise billing, ensuring that the user is only charged for time actually spent providing service. Billing methods in the prior art bill in large blocks of time that are likely to result in over-billing (e.g., the service operator 60 provided services for 46 minutes but billed the user a full hour of time). Third, the user sees the billing time accumulating on the user's computer 50 screen, and may also see billing time stopped when the service operator 60 is idle for more than two minutes, providing the user with additional assurance that the user is only being billed for actual service time.

Once the service session is complete, the user is preferably charged immediately for the service session. For individual users, the billing is preferably done by charging a user credit card associated with the account. User's may also be charged by transferring money from other electronic accounts such as a Paypal© account. Frequent credit card charges will typically not be appropriate for corporate accounts. For these and other large accounts, services may be paid for by depositing lump sums using a credit card, removing money from a debit account, by electronic funds transfer (EFT), by automated clearing house (ACH) transactions or other means.

User access to the support server 54 may be structured so that the user is only able to access support services from a single computer, such as the user computer 50 at an office location for a corporate account. In the alternative, user access may be structured so that the use is allowed to login and receive support from any computer. The support server 54 preferably collects certain information from the user's computer 50 such as hardware and software configuration, thus avoiding the need to ask the user to provide that information. The information preferably obtained is tracked by the support server 54 to allow the service request wizard 58 or other questionnaire to more rapidly identify the service needed (e.g., more rapidly identifying a single problem or area of problems that occurs repeatedly). The information preferably obtained will also preferably allow the support server 54 to identify the different computers from which the user is requesting service.

The user computers 50 described in the above examples may be conventional workstation computers as understood by those skilled in the art but may also be servers, virtual desktops, personal digital assistants (PDAs), home and business automation systems, security systems, multimedia presentation systems, or other systems capable of visually displaying service related information or instructions. As other electronic devices such as home appliances and vehicles become accessible through computer networks, the present invention may be used to provide services through or on these devices. For example, a business or home security system, home automation system or entertainment appliance that needs configuration or programming service will initiate a service request as described above and the appropriate service operator 60 will remotely access the appliance using a computer network such as the Internet and provide services.

Alternatively, the user computer 50, the computer used by the service operator 60 or other computers involved in the service session may include a "dumb" terminal that relies on another computer or computers to perform processing tasks, as will be appreciated by those skilled in the art. Where the user computer 50, computer used by the service operator 60 or other computer includes a dumb terminal, the user computer, computer used by the service operator or other computer may be the dumb terminal and the computer on which it relies for processing collectively (e.g., the user computer 50 in this example is the user's dumb terminal and the computer used for processing together). In this situation, the agent software module 52 may be installed on the processing computer portion of the user computer 50, and the computer on which the dumb terminal relies for processing may be the computer establishing a connection to the service session.

Systems to provide service according to the present invention may be set up on separate partitions in one computer or physically separated on separate computers. The partitions may be divided by industry, region, country, language, partner-based service areas, specialty and/or other criteria. The partitions may be hardware (e.g., physically separated computer or computing components) or software based partitions. The partitions allow services to be provided using different rules for each partition area, prevents information from a system in one partition from inadvertently being made accessible in a separate partition and allows systems in separate partitions to be branded separately. For example, a manufacturer may run a support system using the present invention in which only its support staff are available as service operators 60. In the alternative, a separate partner-based partition could be used that utilizes the manufacturer's support staff as service operators 60 and uses non-manufacturer service operators when additional service operators are needed. The need may be determined by excess demand during certain times, or may be provided from a different time zone when the manufacturer's service operators 60 are not at work, or based on other criteria. Service operators 60 associated with one partition may be made available in other partitions if desired. Systems to provide services according to the present invention may also be partitioned by language, so that the service operators 60 communicate in the preferred language of the user. Language may also be a factor in determining how to allocate service operators 60 to users within a system on a single partition.

The support server 54 may be constructed using a wide variety of hardware and software implementations. It is preferably integrated with a web server to provide a web interface to users, service operators 60, supervisors 62 and and/or all other system participants. The support server 54 may also interact with a controller on one or more service operator 60 computers that allows the operators to establish service session connections through the support server. The support server 54 also preferably accomplishes one or more of the following tasks: acting as a relay between controllers and agents, both agents and controllers may register at the support, and when help request is given to a service operator 60 and accepted by the service operator, support server 54 initiates the remote support session, identifying and/or authorizing system participants, tracking service operators' 60 availability status, processing help requests from users, distributing these amongst service operators 60, tracking support sessions, recording them, storing feedback from users and/or service operators, storing various session data, parameters, and/or events, maintaining support session security, billing users for support session, calculating payout for service operators 60, calculating payout for referral commissions such as sales and marketing agencies, etc., keeping logs of operations, handling user or service operator 60 surges, and/or shortages which may include paging offline service operators and supervisors.

Several support servers 54 may be bound into a "cluster", enabling redundancy and load balancing—that is, they may appear as a single support server to controllers or agent software modules 52 and distribute incoming connections amongst themselves.

As sensitive information may be stored on server (e.g., users' personal data, billing data, customer's business data, vendor software licenses/keys, etc.), it is preferably as secure and "hack-proof" as possible and preferably implements an access control and logging system.

The support server 54 preferably listens on a common port such as SSL 443 for incoming connections from controllers and agent software modules 50. It may accept incoming connections, initiate authentication procedure, and after successful authentication, the controller and agent software module 52 may be marked as "online" in the support server 54 database and supervisors' 62 interface.

The web server may be constructed using a wide variety of hardware and software implementations. It preferably accomplishes one or more of the following tasks: billing history viewing, session/inventory history and details viewing, account/profile management, statistics (reporting), tariffs management, system configuration and maintenance, and/or request distribution rules "tuning".

Accounts or profiles for all entities involved may be managed flexibly. Service operator 60 accounts are preferably effective both in the web interface and controller application. Each account's credentials preferably consist of username and password. After the operator has logged in, the system preferably assigns him "available" status, until changed otherwise. In web interface, manual and automatic (e.g., time period) logoff options are preferably present.

User accounts typically contain personal information, and are preferably bound to a specific person. Several billing account bindings can be added to each user account. Any number of computers identified using agent software module 52 ID's or hardware ID's or other identifiers can be supported under a user account. Corporate and vendor billing accounts can be created with restrictions on type and amount of support available to each user.

Corporate accounts are preferably managed by a company representative, or a person having enough rights to define the company's policy on support provisions for its employees. Likewise, the vendor accounts are preferably managed by the Vendor's representative. To add a binding to corporate support accounts, the user may be required to confirm his right to do this by entering a validation code which may be an employee ID, software key, or other code. With regards to login credentials, passwords are preferably entered each time the person logs in to the website and are preferably not cached. Agent and controller logins preferably have the option of being cached at the user's discretion, and preferably use encryption algorithms such as twofish or blowfish for storage and transmission, along with optionally auto-generated private keys (e.g., time-based keys) to isolate and protect each login.

Corporate accounts for corporate purchasers of services may include one or more of the following items: company name (entered by corporate users while creating their sub accounts), company coordinates/contact person, restrictions/privileges for child accounts, number of agent software module IDs per account, support quotas, support hours, general guidelines for operators for supporting this company personnel (e.g., employees can request help on playing chess game, but all other games are forbidden), or lists of sub-accounts registered with this account, each preferably linked to a corresponding profile. Optionally, restrictions can be set individually for every child account.

User accounts may include one or more of the following items: one or more billing account bindings, private billing account (none or single), corporate (none or single), vendor software support account (any number), contact/personal information, login/password, PC history, list of agent software module 52 ID's used under this account, application history for specific agent software module ID (with optional highlighting of supported software packages), hardware history for specific agent software module ID, both application and hardware histories can be viewed in highlight changes mode, or link to customized support history.

Service operator 60 and supervisor 62 accounts may be configured to allow different levels of access to information. For example, the service operator 60 account preferably provides privileges for simple support call handling and information relating to calls, including access to some statistics and support history. Special service operator 60 accounts may also be created that are preferably the same as regular service operator accounts with "group-level" access to perform maintenance on assigned systems supervisor 62 accounts may include full service operator and special service operator capabilities, and may also have all necessary privileges to perform supervision of support processes. Additional privileges for supervisor 62 accounts may include: view live user/operator support sessions, intercept, assist, and transfer sessions from one operator to another, resolve user feedback issues, adjust billing and commit session charges, adjust service operator 60 skill levels and experience rankings and/or modify service operator privileges. Management and additional privileges assignment are preferably done by superior account type only (e.g., by supervisors 62 for operators, by executive for supervisors). In addition, it may be desirable for all service operator 60 and user accounts are to remain "anonymous" to each other to protect privacy and ensure equality.

Setting operator availability status may be handled in a variety of ways. Operator availability status options may include "online or offline", "available"—such as when the service operator 60 is online and not working on a request, "completely busy"—automatically set when service operator 60 accepts a request, or "partially busy." A service operator 60 may set this status while long maintenance operations are performed. The billing tariff may be lowered during such a period, but the service operator 60 gets a chance to receive additional help requests during this time. Additional status possibilities include "available for problems requiring immediate attention"—A service operator 60 may set this status, for example, if he is working on user's computer 50 while the user is away, and so the service operator 60 can pause the session easily to answer an emergency request. A "time available left" status may be introduced if the request was marked by a user, supervisor 62 or other service operator 60 who evaluated this request previously as "long operation" status.

Operator area or areas of expertise and level of skill within the area of expertise may be determined in a variety of ways including through operator self-reporting, testing operators, through feedback from service sessions and other ways. Information concerning operator area of expertise and level of expertise may be entered by the service operator 60 but are preferably reviewed and confirmed by a supervisor 62 before a service operator begins providing services. After review by the supervisor 62, the information about operators may be locked to prevent operators or others from changing the information. Related areas of expertise may be tracked in a tree list showing areas and sub-areas of skill. Information concerning area of expertise and level of skill may be dynamically adjusted based on information obtained from service sessions including user feedback. In addition to area of expertise and level of skill information, other information concerning friendliness, communication skills and other information may also be tracked.

Service operator 60 load balancing and history of service sessions may also be used to assist in determining the appropriate service operator 60 to be used in a service session. For example, to distribute work evenly, when selecting between equally skilled service operators 60, the system may route call to service operator who has been waiting longest for next help request. Specific user history information is also preferably tracked and can be used in selecting service operators 60. For example, if a service operator 60 has ever worked with a particular user before, the system may take this into consideration when routing the request based on positive or negative feedback from previous service sessions service operators 60 may also be associated with specific corporate clients where the operator has provided services for the corporate client in the past.

The present invention also allows service operators 60 to search for other service operators having qualifications fitting some portion of the service needed and bring those service operators in by some computer connection to assist in providing services. The system may use knowledge bases and internal directories to enable cross-referencing of information as well as internal communications between operators for multi-level assistance and simultaneous screen sharing between multiple operators delivering service to end users on a single or multiple display systems, as well as for groups of end-users (or audience) receiving educational, training, or presentation services from single or multiple service operators 60 performing tasks and presenting coordinated information simultaneously on single or multiple systems with single or multiple displays. For example, a service operator 60 providing services in service area A discovers that the user also needs service in service area B. The service operator 60 then conducts a search or uses a service request wizard 58 or other questionnaire to locate a service operator with qualifications to provide services in service area B and then contacts that service operator to request service. The service operator 60 for service area B then establishes some connection with the user's computer, such as sharing the existing remote desktop connection, and provides services in service area B to the user. In the alternative, the service operator providing services in service area A may transfer the connection to the service operator in service area B instead of sharing the connection. These features of the present invention allow services to be provided on a many to one basis (e.g., a plurality of service operators providing services to a single user at the same time) or on a one-to-many basis (e.g., a single service operator providing services to a number of users at the same time) or any intermediate combination of service operators to users.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A computer-implemented method for allocating services among a plurality of service operators each having associated therewith at least one service area and a respective skill level for the at least one service area, each service operator operating a respective computer, the method comprising:
   receiving at a support server a request for service from a user computer being operated by a user;
   determining a user level awareness of a type of service needed at the support server based upon the received request for service;
   generating a questionnaire to be answered by the user operating the user computer based upon the user level of awareness of the type of service needed at the support server;
   determining the type of service needed based on the answered questionnaire at the support server;
   comparing the respective service areas and skill levels associated with each of the plurality of service operators to the type of service needed at the support server;
   selecting at least one of the plurality of service operators based upon the comparison at the support server;
   at the support server, establishing a support session with the computer being operated by the at least one selected service operator for providing the requested service;
   at the support server, generating a charge associated with the support session;
   collecting user feedback data at the support server for the support session from the user computer for the at least one selected service operator; and
   at the support server, when the feedback data meets a satisfaction threshold, performing a billing transaction comprising billing an account associated with the user and crediting an account associated with the at least one selected service operator.

2. The method of claim 1 wherein the requested service is performed on the user computer operated by the user.

3. The method of claim 1 wherein the requested service is performed on the computer being operated by the at least one selected service operator.

4. The method of claim 1 wherein the requested service is performed at a service workspace that is separate from the user computer and the computer being operated by the at least one selected service operator, with the service workspace being accessible by each.

5. The method of claim 4 wherein the at least one selected service operator continues to provide service on the service workspace even after the user terminates their connection thereto.

6. The method of claim 1 further comprising including in the established support session a computer being operated by a second service operator, the second service operator also for providing the requested service.

7. The method of claim 1 wherein the questionnaire is generated based upon information collected from the user computer being operated by the user.

8. The method of claim 1 wherein generating the questionnaire further comprises prompting the user to select a priority level of the requested service.

9. The method of claim 8 wherein the priority level corresponds to a level of urgency of the requested service.

10. The method of claim 8 wherein the priority level corresponds to a level of expertise by the plurality of service operators.

11. The method of claim 1 wherein establishing the support session further comprises connecting a computer being operated by an initial service operator to the support session for providing the requested service, and subsequently connecting a computer being operated by a supervising service operator to the support session based upon a duration of the support session.

12. The method of claim 1 wherein selecting the at least one service operator further comprises selecting the at least one service operator also based upon a duration the at least one service operator has been waiting to respond to a request for service.

13. The method of claim 1 wherein selecting the at least one service operator further comprises selecting the at least one service operator also based upon a prior service history for prior support session between the at least one service operator and the user.

14. A non-transitory computer-readable medium for a support server for allocating services among a plurality of service operators each having associated therewith at least one service area and a respective skill level for the at least one service area, each service operator operating a respective computer, the non-transitory computer-readable medium having computer-executable instructions for causing the support server to perform steps comprising:
   receiving a request for service from a user computer being operated by a user;
   determining a user level awareness of a type of service needed based upon the received request for service;
   generating a questionnaire to be answered by the user operating the user computer based upon the user level of awareness of the type of service needed;
   determining the type of service needed based on the answered questionnaire;
   comparing the respective service areas and skill levels associated with each of the plurality of service operators to the type of service needed;
   selecting at least one of the plurality of service operators based upon the comparison;

establishing a support session with the computer being operated by the at least one selected service operator for providing the requested service;

generating a charge associated with the support session;

collecting user feedback data for the support session from the user computer for the at least one selected service operator; and when the feedback data meets a satisfaction threshold, performing a billing transaction comprising billing an account associated with the user and crediting an account associated with the at least one selected service operator.

15. The non-transitory computer-readable medium of claim 14 wherein the questionnaire is generated based upon information collected from the user computer being operated by the user.

16. The non-transitory computer-readable medium of claim 14 wherein generating the questionnaire comprises generating the questionnaire further based upon prompting the user to select a priority level of the requested service.

17. The non-transitory computer-readable medium of claim 16 wherein the priority level corresponds to a level of urgency of the requested service.

18. The non-transitory computer-readable medium of claim 14 wherein the priority level corresponds to a level of expertise by the plurality of service operators.

19. The non-transitory computer-readable medium of claim 14 wherein establishing the support session further comprises establishing the support session by further connecting a computer being operated by an initial service operator to the support session for providing the requested service, and subsequently connecting a computer being operated by a supervising service operator to the support session based upon a duration of the support session.

20. The non-transitory computer-readable medium of claim 14 wherein selecting the at least one service operator further comprises selecting the at least one service operator also based upon a duration the at least one service operator has been waiting to respond to a request for service.

* * * * *